United States Patent
Chaponniere et al.

(10) Patent No.: US 12,245,090 B2
(45) Date of Patent: Mar. 4, 2025

(54) IMS VOICE SUPPORT IN NETWORK USING EPS FALLBACK AND HAVING 4G COVERAGE HOLES

(71) Applicant: QUALCOMM Incorporated, San Diego, CA (US)

(72) Inventors: Lenaig Genevieve Chaponniere, La Jolla, CA (US); Abhishek Bhatnagar, San Diego, CA (US); Ajith Tom Payyappilly, San Diego, CA (US); Osama Lotfallah, San Diego, CA (US); Vitaly Drapkin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/810,954

(22) Filed: Jul. 6, 2022

(65) Prior Publication Data

US 2023/0014944 A1    Jan. 19, 2023

Related U.S. Application Data

(60) Provisional application No. 63/219,248, filed on Jul. 7, 2021.

(51) Int. Cl.
*H04L 65/1016* (2022.01)
*H04W 36/00* (2009.01)
*H04W 36/14* (2009.01)

(52) U.S. Cl.
CPC ... *H04W 36/0079* (2018.08); *H04W 36/0066* (2013.01); *H04W 36/1443* (2023.05)

(58) Field of Classification Search
None
See application file for complete search history.

(56) References Cited

U.S. PATENT DOCUMENTS

| | | | |
|---|---|---|---|
| 10,757,590 B2 | 8/2020 | Dash et al. | |
| 2016/0127884 A1* | 5/2016 | Kim | H04W 60/04 |
| | | | 455/435.2 |

(Continued)

FOREIGN PATENT DOCUMENTS

| | | |
|---|---|---|
| GB | 2502304 A | 11/2013 |
| WO | 2022039496 A1 | 2/2022 |

OTHER PUBLICATIONS

3GPP TS 24.301: "3rd Generation Partnership Project, Technical Specification Group Core Network and Terminals, Non-Access-Stratum (NAS) Protocol for Evolved Packet System (EPS), Stage 3 (Release 17)", 3GPP Standard, Technical Specification, 3GPP, Mobile Competence Centre, 650, Route Des Lucioles, F-06921 Sophia-Antipolis Cedex, France, vol. CT WG1, No. V17.3.0, Jun. 28, 2021, pp. 1-564, XP052029846, cited in the application, para. 5.5.1.2.6A, 5.5.1.3.6.

(Continued)

*Primary Examiner* — Minh Trang T Nguyen
(74) *Attorney, Agent, or Firm* — Procopio, Cory, Hargreaves & Savitch LLP

(57) ABSTRACT

A method is provided. The method may be performed by a UE. The method includes attempting to attach to or to perform a tracking area update in an EPS network to obtain voice services for a number of times. The method includes starting a modified timer based on a failure to attach to or to perform the tracking area update in an EPS network for the number of times and based on a configuration parameter. The modified timer may be modified based on a default timer. The method includes keeping an S1 mode enabled when starting the modified timer. The method includes attempting to obtain the voice services based on one or more access technologies other than EPS. The method includes attaching to or performing a tracking area update in the EPS (Continued)

network to obtain voice services based on the modified timer.

30 Claims, 16 Drawing Sheets

(56) References Cited

U.S. PATENT DOCUMENTS

| | | | | |
|---|---|---|---|---|
| 2016/0142860 A1* | 5/2016 | Kim | ..................... | H04W 80/02 455/435.1 |
| 2020/0196186 A1 | 6/2020 | Gupta et al. | | |
| 2021/0051530 A1* | 2/2021 | Venkataraman | .... | H04L 65/1053 |

OTHER PUBLICATIONS

Huawei, et al., "Accelerate Recovery of IMS Voice Service after S1 Disable", 3GPP Draft, S2-2104372, 3rd Generation Partnership Project, Mobile Competence Centre, 650, Route Des Lucioles, F-06921 Sophia-Antipolis Cedex, France, May 10, 2021, 6 Pages, XP052004682, p. 3.

Huawei, et al., "Values for the EPS MM and SM Timers in WB-S1 Mode", 3GPP TSG-Ct WG1 Meeting #102, 24301_CR2765R4_(REL-14)_C1-170938, 3rd Generation Partnership Project, Mobile Competence Centre, 650, Route Des Lucioles, F-06921 Sophia-Antipolis Cedex, France, vol. CT WG1, No. Dubrovnik (Croatia), Feb. 13, 2017-Feb. 17, 2017, 19 Pages, Feb. 27, 2017, XP051231480, paragraph 4.8, paragraph 10.2.

International Search Report and Written Opinion—PCT/US2022/036323—ISA/EPO—Oct. 24, 2022.

NTT DOCOMO: "Correction of Handling of Attach Reject Together with SM Back-off Timer", 3GPP TSG CT WG1 Meeting #76, C1-120123_WAS5335_NIMTC_REL11R5, 3GPP, Mobile Competence Centre, 650, Route Des Lucioles, F-06921 Sophia-Antipolis Cedex, France, vol. CT WG1, No. Xiamen, China, Feb. 6, 2012-Feb. 10, 2012, 4 Pages, Jan. 30, 2012, XP050556452, [retrieved on Jan. 30, 2012] Reason for change, Summary of change.

Qualcomm Incorporated, et al., "Analysis of Solutions for IMS Voice Availability", 3GPP TSG-CT WG1 Meeting #131-e, C1-214162, 3rd Generation Partnership Project, Mobile Competence Centre, 650, Route Des Lucioles, F-06921 Sophia-Antipolis Cedex, France, vol. CT WG1, No. E-meeting, Aug. 19, 2021-Aug. 27, 2021, 4 Pages, Aug. 12, 2021, XP052040153, paragraph 2, paragraph 3.

ETSI TS 124 301: "Universal Mobile Telecommunications System (UMTS); LTE; Non-Access-Stratum (NAS) Protocol for Evolved Packet System (EPS); Stage 3 (3GPP TS 24.301 version 8.3.0 Release 8)", ETSI TS 124 301 V8.3.0 (Sep. 2009), 253 Pages.

* cited by examiner

IMS VOICE SUPPORT IN NETWORK USING EPS FALLBACK AND HAVING 4G COVERAGE HOLES

CROSS REFERENCE TO RELATED APPLICATION(S)

This application claims the benefit of and priority to U.S. Provisional Application Ser. No. 63/219,248, entitled "IMS VOICE SUPPORT IN NETWORK USING EPS FALLBACK AND HAVING 4G COVERAGE HOLES" and filed on Jul. 7, 2021, which is expressly incorporated by reference herein in its entirety.

TECHNICAL FIELD

The present disclosure relates generally to communication systems, and more particularly, to obtaining voice services over evolved packet system (EPS) fallback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method is provided. The method may be performed by a user equipment (UE). The method includes starting a modified timer based on a number of failed attempts associated with voice services for an evolved packet service (EPS) network and based on a configuration parameter. The modified timer may be modified based on a default timer. The method includes attempting to obtain the voice services based on one or more access technologies other than EPS. The method includes attaching to or performing a tracking area update in the EPS network to obtain voice services based on the modified timer.

In another aspect of the disclosure, an apparatus is provided. The apparatus may be a UE. The apparatus includes a memory and at least one processor coupled to the memory, the memory and the at least one processor configured to: start a modified timer based on a number of failed attempts associated with voice services for an EPS network and based on a configuration parameter, where the modified timer may be modified based on a default timer; attempt to obtain the voice services based on one or more access technologies other than EPS; and attach to or perform a tracking area update in the EPS network to obtain voice services based on the modified timer.

In another aspect of the disclosure, an apparatus is provided. The apparatus may be a UE. The apparatus includes means for starting a modified timer based on a number of failed attempts associated with voice services for an EPS network and based on a configuration parameter. The modified timer may be modified based on a default timer. The apparatus includes means for attempting to obtain the voice services based on one or more access technologies other than EPS. The apparatus includes means for attaching to or for performing a tracking area update in the EPS network to obtain voice services based on the modified timer.

In another aspect of the disclosure, a computer-readable medium is provided. The computer-readable medium includes computer executable code at a UE, the code when executed by a processor causes the processor to: start a modified timer based on a number of failed attempts associated with voice services for an EPS network and based on a configuration parameter, where the modified timer may be modified based on a default timer; attempt to obtain the voice services based on one or more access technologies other than EPS; and attach to or perform a tracking area update in the EPS network to obtain voice services based on the modified timer.

In an aspect of the disclosure, a method is provided. The method may be performed by a base station. The method includes transmitting, to a voice-centric UE, an indication of a duration associated with a modified timer. The duration associated with the modified timer may be shorter than a duration associated with a default timer. The method includes failing, initially, to provide voice services to the voice-centric UE via an EPS network. The method includes providing voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services are unavailable over a 5th generation (5G) system (5GS) or over a circuit-switched system.

In another aspect of the disclosure, an apparatus is provided. The apparatus may be a base station. The apparatus includes a memory and at least one processor coupled to the memory, the memory and the at least one processor configured to: transmit, to a voice-centric UE, an indication of a duration associated with a modified timer, the duration associated with the modified timer being shorter than a duration associated with a default timer; fail, initially, to provide voice services to the voice-centric UE via an EPS network; and provide voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services are unavailable over a 5GS or over a circuit-switched system.

In another aspect of the disclosure, an apparatus is provided. The apparatus may be a base station. The apparatus includes means for transmitting, to a voice-centric UE, an indication of a duration associated with a modified timer. The duration associated with the modified timer may be shorter than a duration associated with a default timer. The apparatus includes means for failing, initially, to provide voice services to the voice-centric UE via an EPS network. The apparatus includes means for providing voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services are unavailable over a 5GS or over a circuit-switched system.

In another aspect of the disclosure, a computer-readable medium is provided. The computer-readable medium includes computer executable code at a base station, the code when executed by a processor causes the processor to: transmit, to a voice-centric UE, an indication of a duration associated with a modified timer, the duration associated with the modified timer being shorter than a duration associated with a default timer; fail, initially, to provide voice services to the voice-centric UE via an EPS network; and provide voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services are unavailable over a 5GS or over a circuit-switched system.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
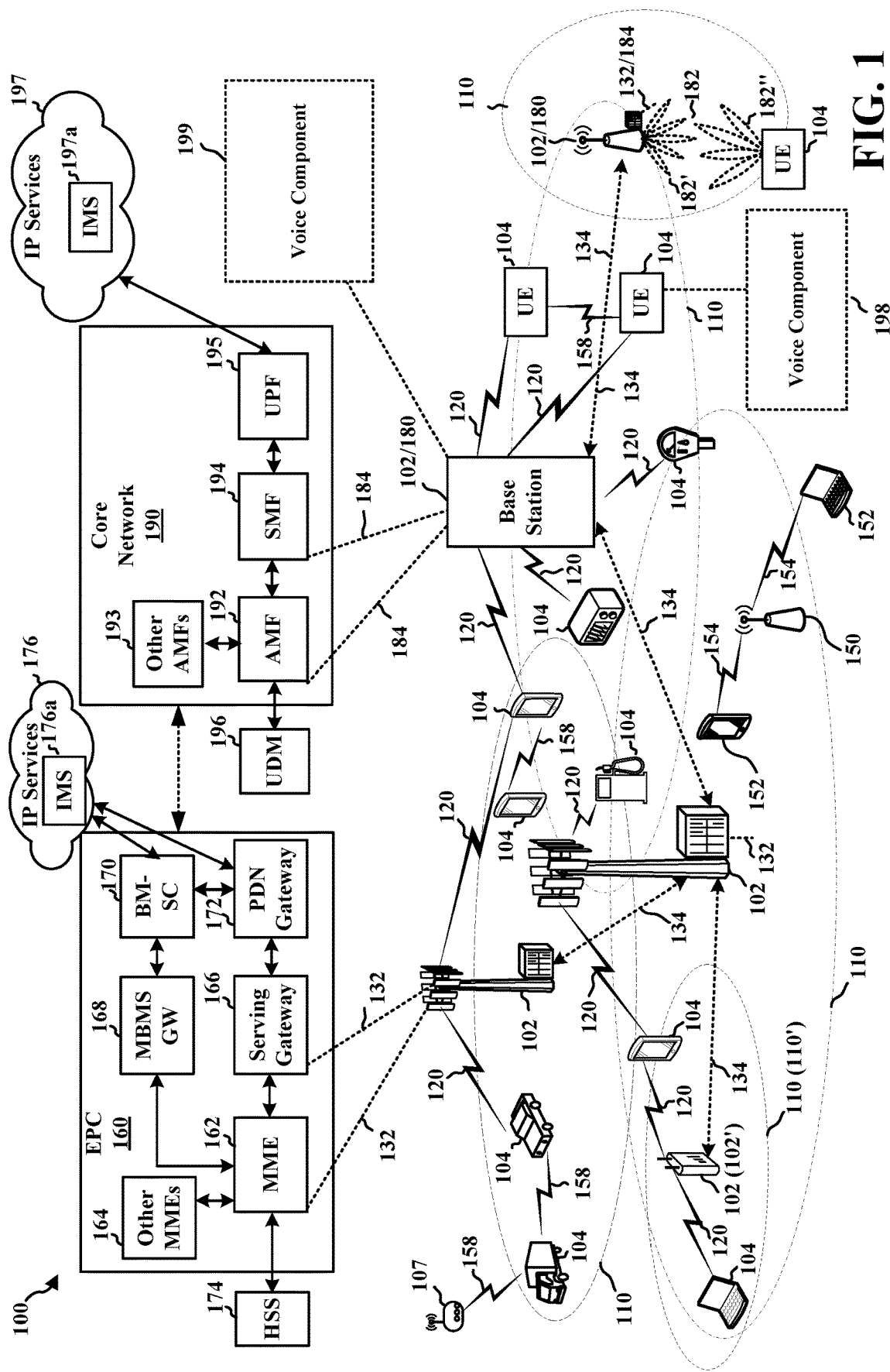
FIG. 1 is a diagram illustrating an example of a wireless communications system and an access network.

In a 5th generation (5G) system (5GS), voice services over the internet protocol (IP) multimedia subsystem (IMS) may be supported either natively (i.e., voice over new radio "NR" "VoNR") or via EPS fallback. Support for VoNR may refer to support for packet-switched based voice services over NR. With EPS fallback, the UE may be handed over or redirected to the EPS (e.g., in a 4th generation "4G" system) in case of either a mobile originated (MO) or mobile terminated (MT) call. An MO call may refer to a call initiated at the UE, and an MT call may refer to a call received at the UE. Herein EPS fallback may refer to a handover or a redirection from a 5GS to an EPS to connect an MO or MT voice call. A UE may be configured to be either voice-centric or data-centric. For example, a smartphone may be configured to be a voice-centric UE, and a sensor may be configured to be a data-centric UE. A voice-centric UE may prioritize voice services over data services. If a network cannot provide voice services to a voice-centric UE, the UE may be diverted to, or search for, other networks or access technologies (e.g., by deprioritizing the network that cannot provide voice services or disabling the access technology via which voice services cannot be obtained). A network, such as a 5G network, may determine whether voice services may be provided to the UE using the UE Radio Capability Match Request procedure. The UE Radio Capability Match Request procedure may refer to a procedure by which an Access and Mobility Management Function (AMF) of a 5GS determines whether IMS voice services are supported for a UE, for example, as described in 3GPP TS 23.501 v16.9.0 subclause 5.4.4.2a. In one aspect, the network (e.g., the AMF of a 5GS) may compare the radio capabilities of the UE and the method(s)

(e.g., access technologies) via which voice is supported in the network. The network may indicate to the UE whether IMS voice is supported for the UE in the Registration Accept message. The Registration Accept message may be a message that an AMF of a 5GS sends to a UE to indicate that the AMF has accepted the UE's registration request, for example, as described in 3GPP TS 24.501 v16.9.0 subclause 5.5.1.3.4. In one example, if IMS voice is supported, the Registration Accept message may not specify whether IMS voice is supported via VoNR or EPS fallback.

In one or more aspects, a voice-centric UE may experience long periods without access to voice services due to the voice services being provided via EPS fallback in a 5GS network and the UE having difficulty attaching to or performing a tracking area update in an EPS network. Attaching to a network may refer to transmitting an Attach Request message, for example, as described in 3GPP TS 24.301 v16.8.0 subclause 5.5.1.2.2 to obtain services from a network (e.g., an EPS network). Performing a tracking area update may refer to transmitting a Tracking Area Update Request message, for example, as described in 3GPP TS 24.301 v16.8.0 subclause 5.5.3.2.2 to notify a network (e.g., an EPS network) that a registered UE has moved to a Tracking Area not included in the current Tracking Area Identities list. In one example, the UE may be voice-centric, and VoNR may not be supported in the 5GS network (i.e., voice may only be supported via EPS fallback). Further, voice services via earlier circuit-switched technologies (e.g., 2nd generation "2G"/third generation "3G") may not be available because the spectrum may have been repurposed for other radio access technologies. Due to the difficulty in attaching to or performing a tracking area update in the EPS network, the UE may experience a long period without access to voice services.

In one example, a long period without access to voice services may occur as follows. First, due to poor EPS coverage, the UE may fail to attach to an EPS network or perform a tracking area update in the EPS network a number of times (e.g., 5 times) in a row, which may cause the UE to disable the S1 mode (i.e., the mode relating to the 4G/EPS capability of the UE) and start the timer T3402 (the default duration for which may be 12 minutes). The number of times may be predetermined. According to one or more aspects, the Si mode may refer to the operating mode in which a UE communicates with a Mobility Management Entity (MME) of an EPS, for example, as described in TS 24.301 v16.8.0 subclause 3.1 et al. The timer T3402 may be an EPS mobility management timer. The timer T3402 may be associated with a reattempt to attach to or perform a tracking area update in an EPS network. By default, the UE may not reattempt to attach to or perform a tracking area update in an EPS network before the timer T3402 expires. Then, the UE may attempt to attach to or perform a tracking area update in a 5GS network and may indicate to the 5GS network that the S1 mode is disabled in the Registration Request message. Since the network may support voice services via EPS fallback, and EPS fallback may be unusable when the S1 mode is disabled, the network may indicate "IMS voice over 3GPP access is not supported" in the Registration Accept message. Because the UE is voice-centric, receiving the "IMS voice over 3GPP access is not supported" indication in the Registration Accept message may cause the UE to disable the N1 mode (i.e., the mode relating to the 5G capability of the UE). According to one or more aspects, the N1 mode may refer to the operating mode in which a UE communicates with an AMF of a 5GS, for example, as described in TS 24.501 v16.9.0 subclause 3.1 et al. With the S1 mode and the N1 mode both disabled, the UE may search for 2G/3G networks for voice services and may not find any. Finally, the UE may re-enable the N1 mode and may camp in the 5GS network. The UE may be unable to obtain voice services via EPS fallback until the timer T3402 expires. As a result, the user may experience a noticeable period without access to voice services.

Aspects presented herein provide mechanisms for the UE to improve wireless communication between a UE and a network and to enable the UE to access a network in a reduced amount of time when performing EPS fallback. In some aspects, the UE may skip disabling the S1 mode when the T3402 timer is started. Therefore, because the S1 mode is kept enabled, the UE may not receive the "IMS voice over 3GPP access is not supported" indication in the Registration Accept message. As a result, the UE may not disable the N1 mode, and may not waste the time attempting to obtain the voice services via the legacy 2G/3G networks.

In some aspects, the UE may use a shorter T3402 timer value than that of the unmodified or default T3402 timer based on a UE configuration parameter indicating for the UE to use a shorter T3402 timer value. In some aspects, the UE may receive a configuration of a shorter T3402 timer value. In some aspects, when the N1 mode is re-enabled, the UE may also re-enable the S1 mode. In some aspects, if the T3402 timer is running and the S1 mode is disabled, the UE may periodically check the quality of 4G cells. A 4G cell may refer to a radio cell of an Evolved Universal Mobile Telecommunications System (UMTS) Terrestrial Radio Access (E-UTRAN) network, for example, as described in 3GPP TS 38.300 v16.6.0 subclause 3.2 et al. If the cell quality is above a certain threshold for more than a threshold amount of time, the UE may re-enable the S1 mode and stop the T3402 timer. The cell quality may be based on or may refer to the signal to noise ratio (SNR) of an E-UTRAN cell, for example, as described in 3GPP TS 38.300 v16.6.0 subclause 9.2.4 et al. Accordingly, the periods during which the voice-centric UE is without any access to voice services may be reduced, and user experience may be improved.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems (5GSs), may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS) 176a, a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS) 197a, a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a voice component 198 that may be configured to attempt to attach to or to perform a tracking area update in an EPS network to obtain voice services for a number of times. The voice component 198 may be configured to start a modified timer based on a failure to attach to or to perform the tracking area update in an EPS network for the number of times and based on a configuration parameter. The modified timer may be modified based on a default timer. The number of times may be a predetermined, or defined, number of times, in some aspects. The voice component 198 may be configured to attempt to obtain voice services based on one or more access technologies other than EPS. The voice component 198 may be configured to attach to or perform a tracking area update in the EPS network to obtain voice services based on the modified timer (e.g., based on stopping the modified timer or based on an expiration of the modified timer). In certain aspects, the base station 180 may include a voice component 199 that may be configured to transmit, to a voice-centric UE, an indication of a duration associated with a modified timer. The duration associated with the modified timer may be shorter than a duration associated with a default timer. The voice component 199 may be configured to fail, initially, to provide voice services to the voice-centric UE via an EPS network. The voice component 199 may be configured to provide voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services may not be available over a 5GS or over a circuit-switched system. Although the following description may be focused on 5G NR, the concepts described herein may be applicable to other similar areas, such as LTE, LTE-A, CDMA, GSM, and other wireless technologies.

Herein a network node can be implemented as an aggregated base station, as a disaggregated base station, an integrated access and backhaul (IAB) node, a relay node, a sidelink node, etc. A network node/entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

Figure 2:
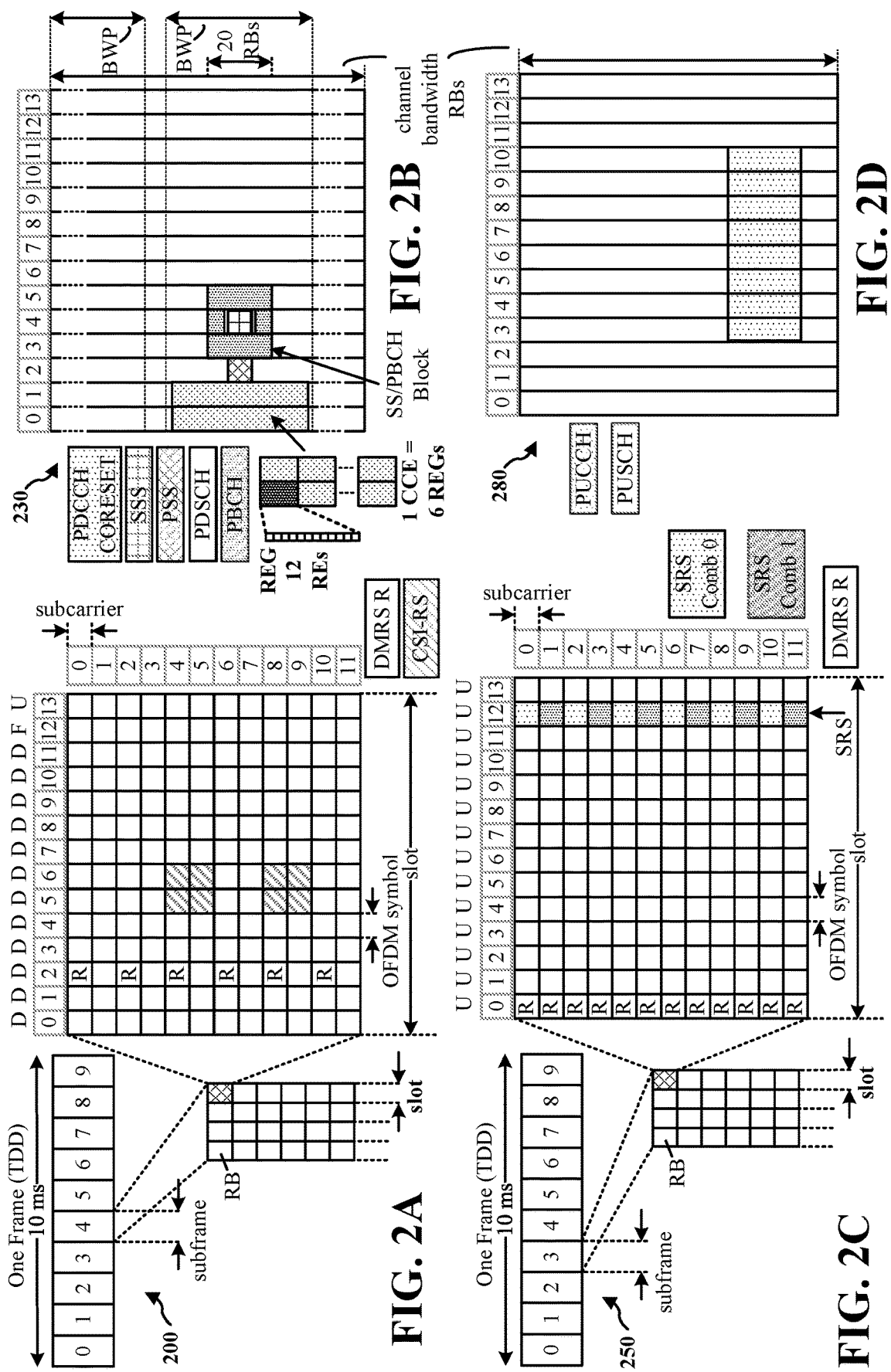
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
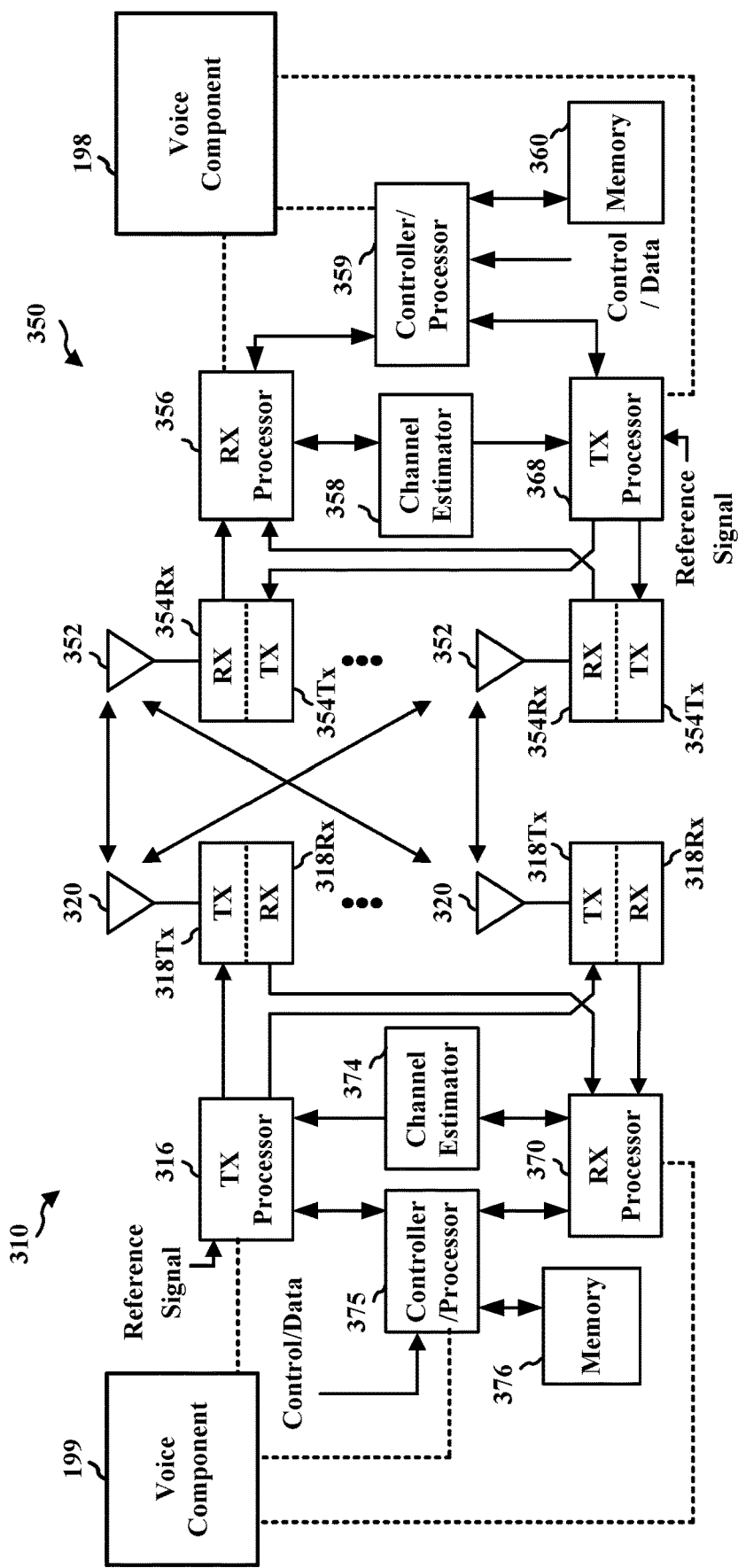
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the voice component 198 of FIG. 1.

At least one of the TX processor 316, the RX processor 370, and the controller/processor 375 may be configured to perform aspects in connection with the voice component 199 of FIG. 1.

Figure 4:
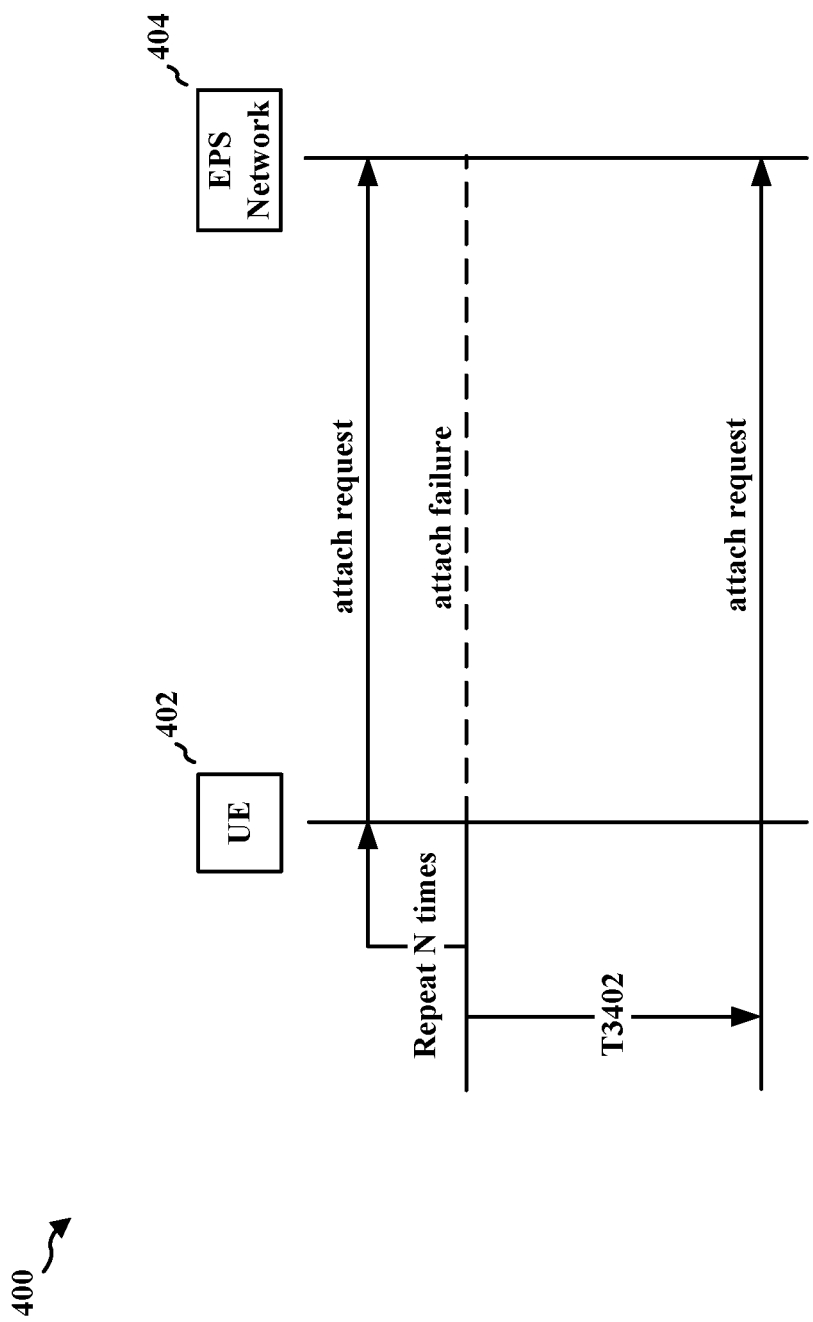
FIG. 4 is a diagram illustrating the unmodified timer T3402.

FIG. 4 is a diagram 400 illustrating the unmodified (or default) timer T3402. The UE 402 may attempt to attach to or perform a tracking area update in the EPS network 404. If the attach attempt fails repeatedly for a predetermined number (e.g., N) of times, the UE 402 may start the timer T3402. The UE 402 may not reattempt to attach to or perform a tracking area update in the EPS network 404 before the timer T3402 expires.

In one or more aspects, a voice-centric UE may experience long periods without access to voice services due to the voice services being provided via EPS fallback in a 5GS network and the UE having difficulty attaching to or performing a tracking area update in an EPS network. In one example, the UE may be voice-centric, and VoNR may not be supported in the 5GS network (i.e., voice may only be supported via EPS fallback). Further, voice services via earlier circuit-switched technologies (e.g., 2G/3G) may not be available because the spectrum may have been repurposed for other radio access technologies. Due to the difficulty in attaching to or performing a tracking area update in the EPS network, the UE may experience a long period without access to voice services.

In one example, a long period without access to voice services may occur as follows. First, due to poor EPS coverage, the UE may fail to attach to or perform a tracking area update in the EPS network 5 times in a row, which may cause the UE to disable the S1 mode (i.e., the mode relating to the 4G/EPS capability of the UE) and start the timer T3402 (the default duration for which is 12 minutes). The timer T3402 may be associated with a reattempt to attach to or perform a tracking area update in an EPS network. By default, the UE may not reattempt to attach to or perform a tracking area update in an EPS network before the timer T3402 expires. Then, the UE may attempt to attach to or perform a tracking area update in a 5GS network and may indicate to the 5GS network that the S1 mode is disabled in the Registration Request message. Since the network may support voice services via EPS fallback, and EPS fallback may be unusable when the S1 mode is disabled, the network may indicate "IMS voice over 3GPP access is not supported" in the Registration Accept message. Because the UE is voice-centric, receiving the "IMS voice over 3GPP access is not supported" indication in the Registration Accept message may cause the UE to disable the N1 mode (i.e., the mode relating to the 5G capability of the UE). With the S1 mode and the N1 mode both disabled, the UE may search for 2G/3G networks for voice services and may not find any. Finally, the UE may re-enable the N1 mode and may camp in the 5GS network. The UE may be unable to obtain voice services via EPS fallback until the timer T3402 expires. As a result, the user may experience a noticeable period without access to voice services.

Figure 5:
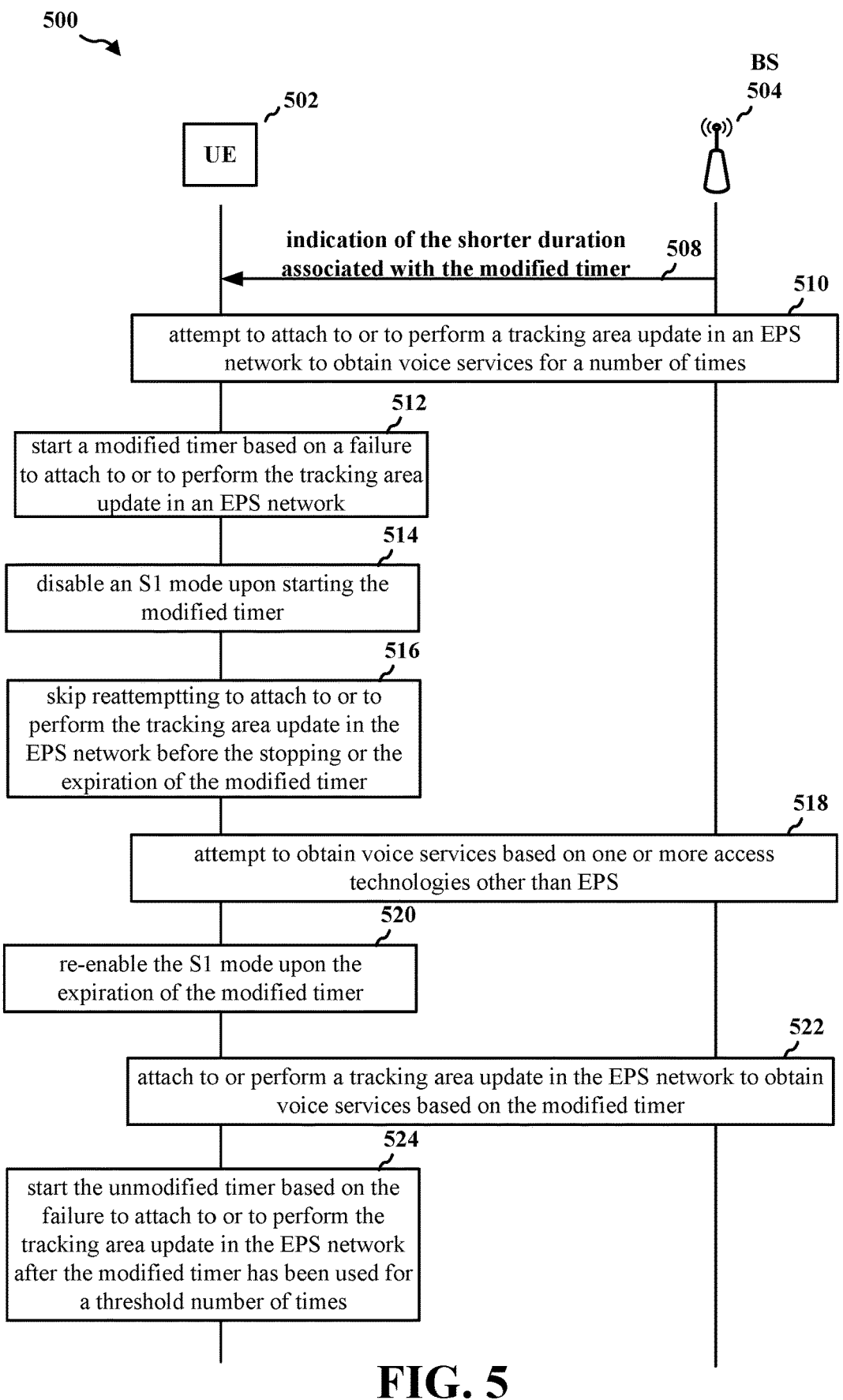
FIG. 5 is a diagram of a communication flow of a method of wireless communication.

FIG. 5 is a diagram of communication flow 500 of a method of wireless communication. VoNR may not be available from the base station 504. At 510, the UE 502 may attempt to attach to an EPS network or to perform a tracking area update in an EPS network to obtain voice services for a number of times. The number of times may be a predetermined, or defined, number of times, in some aspects. At 512, the UE 502 may start a modified timer based on a failure to attach to or to perform the tracking area update in an EPS network for the number of times and based on a configuration parameter. The modified timer may be modified based on a default timer. In one or more configurations, the configuration parameter may be stored in a mobile equipment (ME) or a universal subscriber identify module (USIM) of the UE 502. At 514, the UE 502 may disable an S1 mode upon starting the modified timer. At 516, the UE 502 may skip reattempting to attach to or to perform the tracking area update in the EPS network before the stopping (e.g., the modified timer may be stopped early if the cell quality is above a certain threshold for more than a threshold amount of time) or the expiration of the modified timer. At 518, the UE 502 may attempt to obtain the voice services based on one or more access technologies other than EPS. In some aspects, the UE may attempt to obtain the voice services from each of the one or more access technologies. The attempt at 518 may also fail.

In one aspect, the modified timer may be associated with a shorter duration (e.g., 3 minutes, 4 minutes, etc.) than the unmodified/default timer T3402. The modified timer may be used at 512 based on a value of a configuration parameter (e.g., a "UseReducedT3402" parameter). The shorter duration of the modified timer may be stored in an ME or a USIM of the UE 502. It should be appreciated that the UE 502 may use the modified timer associated with the shorter duration regardless of the quality of the EPS coverage. The UE 502 may still be without voice services for the duration of the modified timer.

In one aspect, the modified timer with the shorter duration may be used the first predetermined number of times (e.g., 2 times), where the unmodified timer T3402 would otherwise be used, after the most recent powering up of the UE 502. After the modified timer has been used for the predetermined number of times, on the next occasion and on further occasions when the timer T3402 is started, the unmodified timer T3402 with the default duration may be used. In other words, at 524, the UE 502 may start the unmodified timer based on the failure to attach to or to perform the tracking area update in the EPS network after the modified timer has been used for a threshold number of times subsequent to a most recent powering up of the UE. By limiting the number of times the modified timer is used, the UE 502 may revert to using the unmodified timer T3402 with the default duration if the UE 502 is truly outside of the 4G/EPS coverage area, and is not temporarily in a coverage hole. As a result, energy may not be wasted on an excessive number of failed attempts to attach to or perform the tracking area update in the EPS network.

In one aspect, the shorter duration associated with the modified timer may be preconfigured.

In one aspect, the shorter duration associated with the modified timer may be based on an indication that the UE 502 receives from the base station 504. In other words, the UE 502 may receive, from a base station 504, an indication of the shorter duration associated with the modified timer. Accordingly, the network operator may tailor the duration of the modified timer to the specific deployment.

At 520, the UE 502 may re-enable the S1 mode upon the expiration or stopping of the modified timer. At 522, the UE 502 may attach to or perform a tracking area update in the EPS network to obtain voice services based on the modified timer (e.g., based on stopping the modified timer or based on an expiration of the modified timer).

Figure 6:
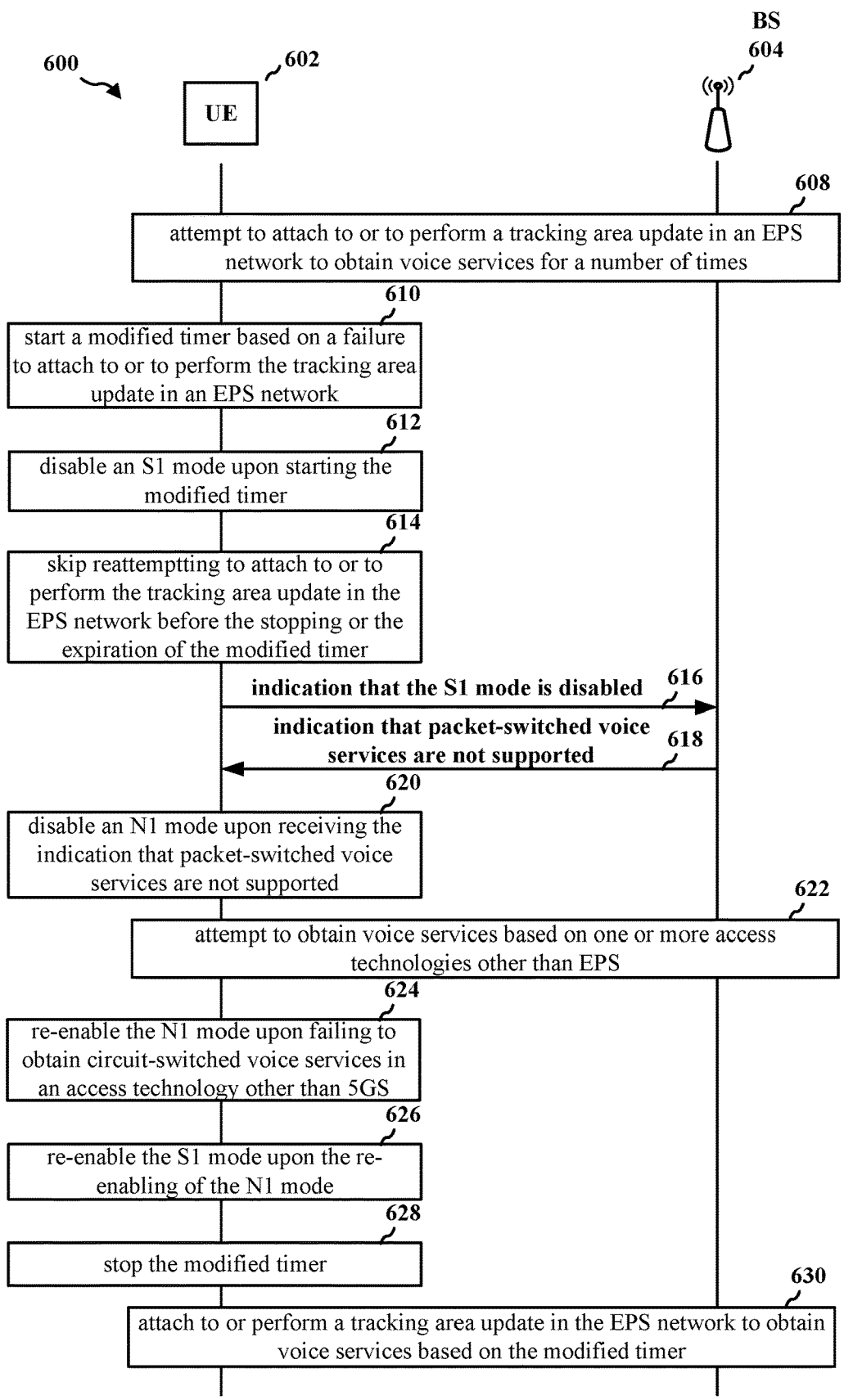
FIG. 6 is a diagram of a communication flow of a method of wireless communication.

FIG. 6 is a diagram of communication flow 600 of a method of wireless communication. VoNR may not be available from the base station 604. At 608, the UE 602 may attempt to attach to or to perform a tracking area update in an EPS network to obtain voice services for a number of times. The number of times may be a predetermined, or defined, number of times, in some aspects. At 610, the UE 602 may start a modified timer based on a failure to attach to or to perform the tracking area update in an EPS network for the number of times and based on a configuration parameter. The modified timer may be modified based on a default timer. At 612, the UE 602 may disable an S1 mode upon starting the modified timer. At 614, the UE 602 may skip reattempting to attach to or to perform the tracking area update in the EPS network before the stopping (e.g., the modified timer may be stopped early if the cell quality is above a certain threshold for more than a threshold amount of time) or the expiration of the modified timer. At 616, the UE 602 may transmit, to a 5GS base station 604, an indication that the S1 mode is disabled. At 618, the UE 602 may receive, from the 5GS base station 604, an indication that packet-switched voice services are not supported. At 620, the UE 602 may disable an N1 mode upon receiving the indication that packet-switched voice services are not supported. At 622, the UE 602 may attempt to obtain the voice services based on one or more access technologies other than EPS (e.g., 2G/3G access technologies). The attempt at 622 may also fail. At 624, the UE 602 may re-enable the N1 mode upon failing to obtain circuit-switched voice services in an access technology other than 5GS. Although aspects are described for an example of a 5GS network and other access technologies in order to illustrate the concept, the aspects may be similarly applied to other access technologies, including future access technologies. For example, a UE may transmit, to a base station of a first access technology, an indication that the S1 mode is disabled and may receive, from the base station, an indication that packet-switched voice services are not supported. The UE may disable an operating mode associated with the first access technology upon receiving the indication that packet-switched voice services are not supported, and may re-enable the operating mode associated with the first access technology upon failing to obtain voice services in one or more access technologies (e.g., different than the first access technology of the base station).

In one aspect, the UE 602 may re-enable the S1 mode upon the re-enabling of the N1 mode at 624. Further, the UE may stop the modified timer upon the re-enabling of the N1 mode and the S1 mode. The use of the modified timer at 610 may be based on a value of a configuration parameter (e.g., an "EnableT3402EarlyStop" parameter). In other words, at 626, the UE 602 may re-enable the S1 mode upon the re-enabling of the N1 mode. At 628, the UE 602 may stop the modified timer upon the re-enabling of the S1 mode. Accordingly, the UE 602 may regain voice services before the natural expiry of the unmodified timer T 3402. However, it should be appreciated that the EPS coverage may still be poor when the modified timer is stopped, in which case the attempt to obtain the voice services via EPS fallback may fail again.

In one aspect, the UE 602 may re-enable the S1 mode upon the re-enabling of the N1 mode at 624. Further, the UE may stop the modified timer upon one of a reselection by the UE to the EPS network, or a handover or a redirection by a network to the EPS network. The use of the modified timer at 610 may be based on a value of a configuration parameter (e.g., an "EnableT3402EarlyStop" parameter). In other words, at 626, the UE 602 may re-enable the S1 mode upon the re-enabling of the N1 mode. At 628, the UE 602 may stop the modified timer upon one of a reselection by the UE to the EPS network, or a handover or a redirection by a network to the EPS network. Accordingly, the UE 602 may regain voice services before the natural expiry of the unmodified timer T3402. However, it should be appreciated that the N1 mode may still be disabled at 620 after the disabling of the S1 mode at 612, and an attempt to obtain the voice services through 2G/3G access technologies may still be made at 622 before the UE may return to the 5GS network at 624 and regain voice services at 630. In other words, the user may still experience a period without voice services.

At 630, the UE 602 may attach to or perform a tracking area update in the EPS network to obtain voice services based on the modified timer (e.g., based on stopping the modified timer or based on an expiration of the modified timer).

Figure 7:
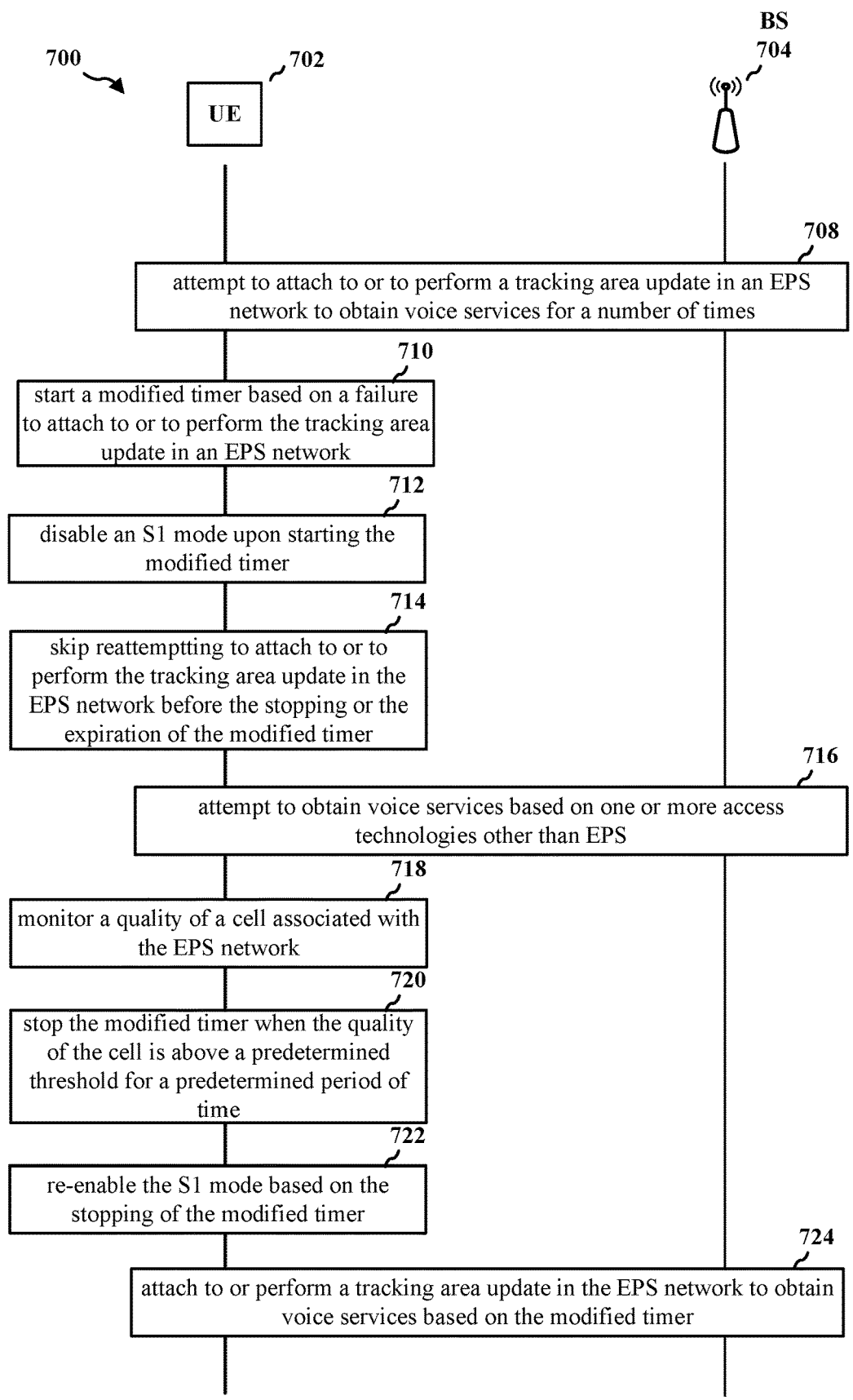
FIG. 7 is a diagram of a communication flow of a method of wireless communication.

FIG. 7 is a diagram of communication flow 700 of a method of wireless communication. VoNR may not be available from the base station 704. At 708, the UE 702 may attempt to attach to or to perform a tracking area update in an EPS network to obtain voice services for a number of times. At 710, the UE 702 may start a modified timer based on a failure to attach to or to perform the tracking area update in an EPS network for the number of times and based on a configuration parameter. The modified timer may be modified based on a default timer. At 712, the UE 702 may disable an Si mode upon starting the modified timer. At 714, the UE 702 may skip reattempting to attach to or to perform the tracking area update in the EPS network before the stopping (e.g., the modified timer may be stopped early if the cell quality is above a certain threshold for more than a threshold amount of time) or the expiration of the modified timer. At 716, the UE 702 may attempt to obtain the voice services based on one or more access technologies other than EPS. The attempt at 716 may also fail.

In one aspect, when the modified timer is running subsequent to 710, and the S1 mode is disabled subsequent to 712, the access stratum (AS) at the UE 702 may periodically check the quality of the 4G/EPS cells. If the cell quality is above a predetermined threshold for more than a predetermined duration, the UE 702 may re-enable the S1 mode and stop the modified timer. The use of the modified timer at 710 may be based on a value of a configuration parameter (e.g., an "EnableT3402EarlyStop" parameter). In other words, at 718, the UE 702 may monitor a quality of a cell associated with the EPS network. At 720, the UE 702 may stop the modified timer when the quality of the cell is above a predetermined threshold for a predetermined period of time.

At 722, the UE 702 may re-enable the S1 mode based on the stopping of the modified timer. Accordingly, the UE 702 may regain voice services before the natural expiry of the unmodified timer T3402. Further, the UE 702 may re-enable the S1 mode and stop the modified timer when the EPS coverage is sufficiently good. However, it should be appreciated that stopping a NAS timer based on an AS trigger may be considered a layer violation.

At 724, the UE 702 may attach to or perform a tracking area update in the EPS network to obtain voice services based on the modified timer (e.g., based on stopping the modified timer or based on an expiration of the modified timer).

Figure 8:
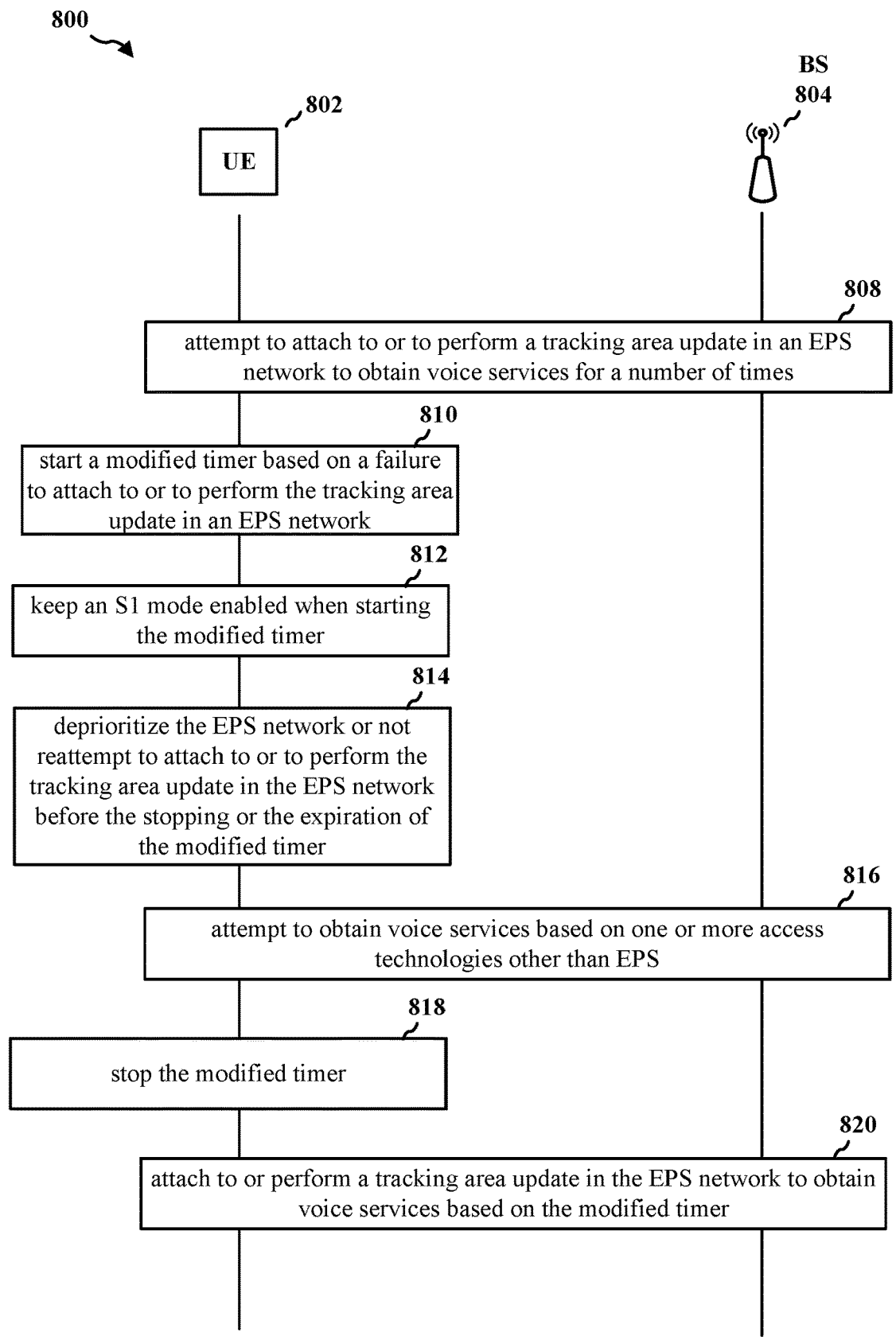
FIG. 8 is a diagram of a communication flow of a method of wireless communication.

FIG. 8 is a diagram of communication flow 800 of a method of wireless communication. VoNR may not be available from the base station 804. At 808, the UE 802 may attempt to attach to or to perform a tracking area update in an EPS network to obtain voice services for a number of times. The number of times may be a predetermined, or defined, number of times, in some aspects. At 810, the UE 802 may start a modified timer based on a failure to attach to or to perform the tracking area update in an EPS network for the number of times and based on a configuration parameter. The modified timer may be modified based on a default timer. At 816, the UE 802 may attempt to obtain the voice services based on one or more access technologies other than EPS. The attempt at 816 may also fail.

The UE 802 may not disable the Si mode when the modified timer is started at 810. When the modified timer is running subsequent to 810 and before the stopping (e.g., the modified timer may be stopped early if the cell quality is above a certain threshold for more than a threshold amount of time) or the expiration of the modified timer, the UE 802 may either deprioritize the EPS network (regardless of the priorities indicated by the network), or may not reattempt to attach to or to perform a tracking area update in the EPS network. The use of the modified timer at 810 may be based on a value of a configuration parameter (e.g., an "EnableT3402EarlyStop" parameter). Because the S1 mode is kept enabled, the UE may not receive the "IMS voice over 3GPP access is not supported" indication in the Registration Accept message. As a result, the UE may not disable the N1 mode, and may not waste the time attempting to obtain the voice services via the legacy 2G/3G networks (i.e., in some configurations, 816 may not be performed). Therefore, at 812, the UE 802 may keep an S1 mode enabled when starting the modified timer. At 814, the UE 802 may deprioritize the EPS network or not reattempt to attach to or to perform the tracking area update in the EPS network before the stopping or the expiration of the modified timer.

In one aspect, the UE 802 may not reattempt to attach to or to perform a tracking area update in the EPS network before the stopping or the expiration of the modified timer. The UE 802 may stop the modified timer upon one of a reselection by the UE to the EPS network, a handover to the EPS network, or a redirection by a network to the EPS network. In other words, at 818, the UE 802 may stop the modified timer upon one of a reselection by the UE to the EPS network, a handover to the EPS network, or a redirection by a network to the EPS network. Accordingly, the UE 802 may regain voice services before the natural expiry of the unmodified timer T3402.

In one aspect, the UE 802 may deprioritize one or more cells associated with the EPS network for cell reselection before the stopping or the expiration of the modified timer, regardless of the priorities indicated by the network. The UE 802 may stop the modified timer upon one of a handover to the EPS network or a redirection by a network to the EPS network. In other words, at 818, the UE 802 may stop the modified timer upon one of a handover to the EPS network or a redirection by a network to the EPS network. Accordingly, the UE 802 may regain voice services before the natural expiry of the unmodified timer T3402. However, it should be appreciated that the UE 802 may override normal cell reselection rules.

At 820, the UE 802 may attach to or perform a tracking area update in the EPS network to obtain voice services based on the modified timer (e.g., based on stopping the modified timer or based on an expiration of the modified timer).

Figure 9:
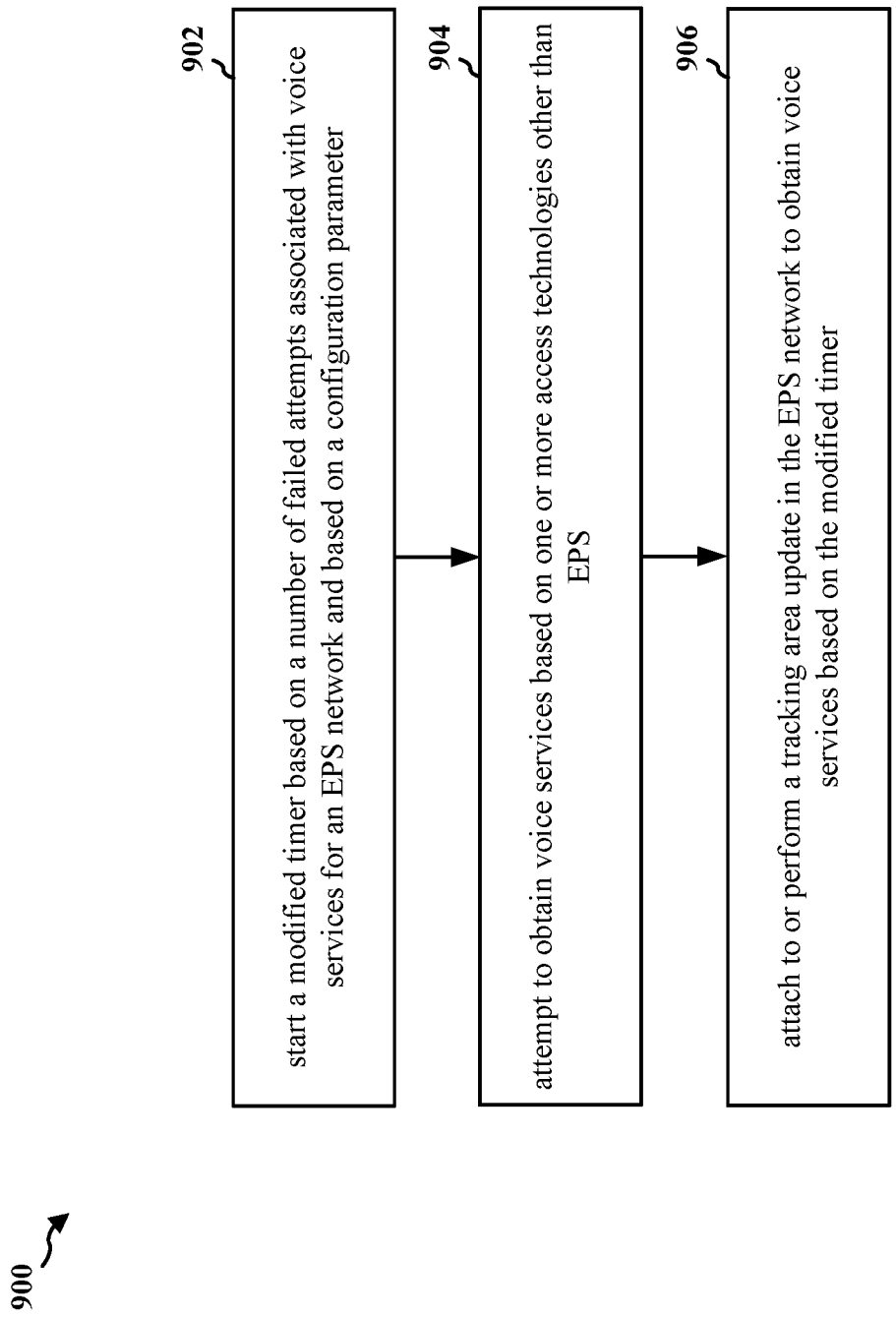
FIG. 9 is a flowchart of a method of wireless communication.

FIG. 9 is a flowchart 900 of a method of wireless communication. The method may be performed by a UE (e.g., the UE 104/350/502/602/702/802; the apparatus 1502). At 902, the UE may start a modified timer based on a number of failed attempts associated with voice services for an EPS network and based on a configuration parameter. The modified timer may be modified based on a default timer. For example, 902 may be performed by the component 198 in FIG. 15. Referring to FIGS. 5-8, at 512, 610, 710, 810, the UE 502, 602, 702, 802 may start a modified timer based on a number of failed attempts associated with voice services for an EPS network and based on a configuration parameter.

At 904, the UE may attempt to obtain the voice services based on one or more access technologies other than EPS. For example, 904 may be performed by the component 198 in FIG. 15. Referring to FIGS. 5-8, at 518, 622, 716, 816, the UE 502, 602, 702, 802 may attempt to obtain the voice services based on one or more access technologies other than EPS.

At 906, the UE may attach to or perform a tracking area update in the EPS network to obtain voice services based on the modified timer (e.g., based on stopping the modified timer or based on an expiration of the modified timer). For example, 906 may be performed by the component 198 in FIG. 15. Referring to FIGS. 5-8, at 522, 630, 724, 820, the UE 502, 602, 702, 802 may attach to or perform a tracking area update in the EPS network to obtain voice services based on the modified timer.

Figure 10:
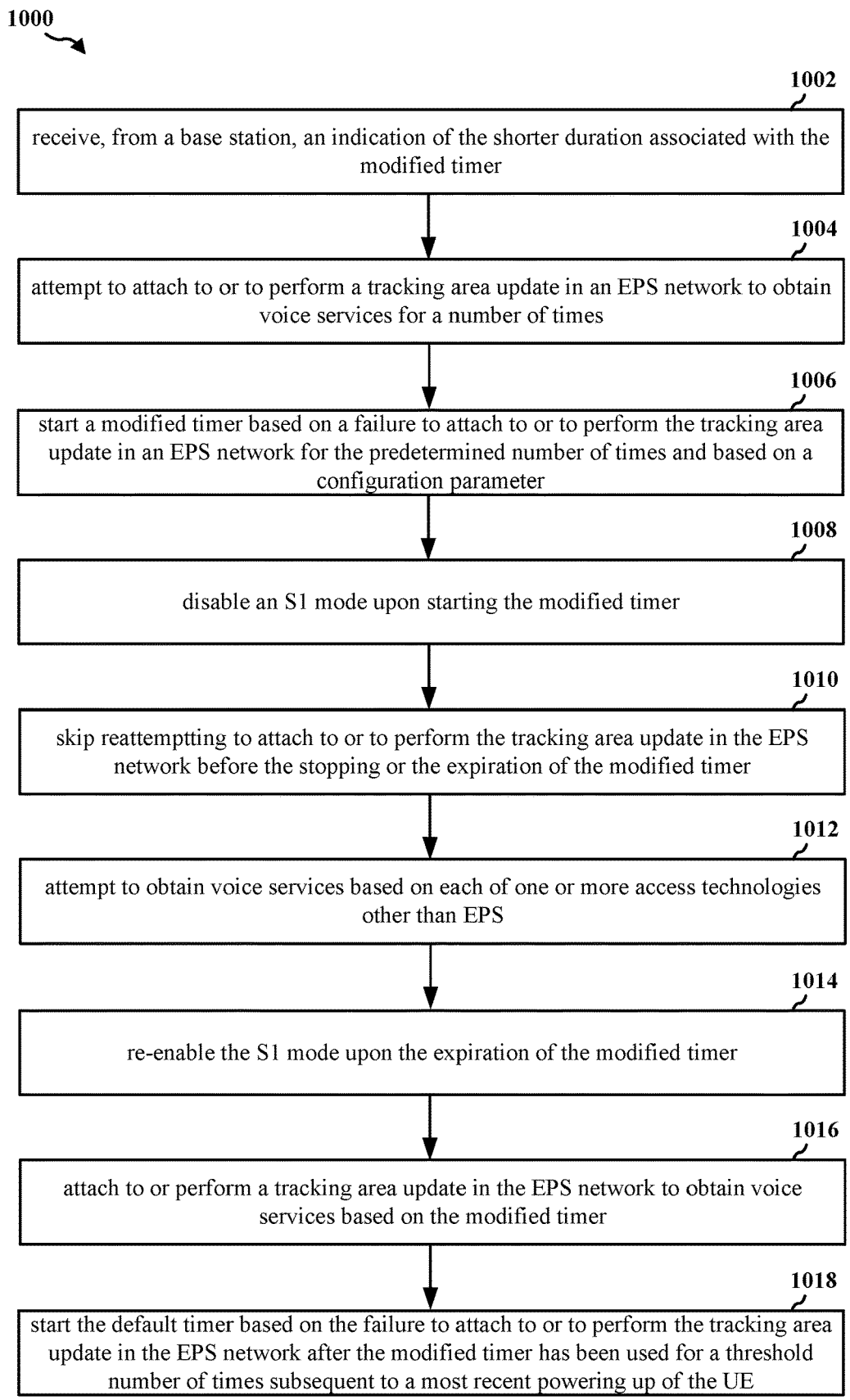
FIG. 10 is a flowchart of a method of wireless communication.

FIG. 10 is a flowchart 1000 of a method of wireless communication. The method may be performed by a UE (e.g., the UE 104/350/502; the apparatus 1502). At 1004, the UE may attempt to attach to or to perform a tracking area update in an EPS network to obtain voice services for a number of times. The number of times may be a predetermined, or defined, number of times, in some aspects. For example, 1004 may be performed by the component 198 in FIG. 15. Referring to FIG. 5, at 510, the UE 502 may attempt to attach to or to perform a tracking area update in an EPS network to obtain voice services for a number of times.

At 1006, the UE may start a modified timer based on a failure to attach to or to perform the tracking area update in an EPS network for the number of times and based on a configuration parameter. The modified timer may be modified based on a default timer. For example, 1006 may be performed by the component 198 in FIG. 15. Referring to FIG. 5, at 512, the UE 502 may start a modified timer based on a failure to attach to or to perform the tracking area update in an EPS network for the number of times and based on a configuration parameter.

At 1012, the UE may attempt to obtain the voice services based on one or more access technologies other than EPS. For example, 1012 may be performed by the component 198 in FIG. 15. Referring to FIG. 5, at 518, the UE 502 may attempt to obtain the voice services based on one or more access technologies other than EPS.

At 1016, the UE may attach to or perform a tracking area update in the EPS network to obtain voice services based on the modified timer (e.g., based on stopping the modified timer or based on an expiration of the modified timer). For example, 1016 may be performed by the component 198 in FIG. 15. Referring to FIG. 5, at 522, the UE 502 may attach to or perform a tracking area update in the EPS network to obtain voice services based on the modified timer.

In one configuration, at 1008, the UE may disable an S1 mode upon starting the modified timer. For example, 1008 may be performed by the component 198 in FIG. 15. Referring to FIG. 5, at 514, the UE 502 may disable an S1 mode upon starting the modified timer. At 1010, the UE may skip reattempting to attach to or to perform the tracking area update in the EPS network before the stopping or the expiration of the modified timer. For example, 1010 may be performed by the component 198 in FIG. 15. Referring to FIG. 5, at 516, the UE 502 may skip reattempting to attach to or to perform the tracking area update in the EPS network before the stopping or the expiration of the modified timer.

In one configuration, the modified timer may be associated with a shorter duration than an unmodified/default timer. At 1014, the UE may re-enable the S1 mode upon the expiration of the modified timer. For example, 1014 may be performed by the component 198 in FIG. 15. Referring to FIG. 5, at 520, the UE 502 may re-enable the S1 mode upon the expiration of the modified timer.

In one configuration, at 1018, the UE may start the unmodified/default timer based on the failure to attach to or to perform the tracking area update in the EPS network after the modified timer has been used for a threshold number of times subsequent to a most recent powering up of the UE. For example, 1018 may be performed by the component 198 in FIG. 15. Referring to FIG. 5, at 524, the UE 502 may start the unmodified/default timer based on the failure to attach to or to perform the tracking area update in the EPS network after the modified timer has been used for a threshold number of times subsequent to a most recent powering up of the UE 502.

In one configuration, the shorter duration associated with the modified timer may be preconfigured.

In one configuration, at 1002, the UE may receive, from a base station, an indication of the shorter duration associated with the modified timer. For example, 1002 may be performed by the component 198 in FIG. 15. Referring to FIG. 5, at 508, the UE 502 may receive, from a base station 504, an indication of the shorter duration associated with the modified timer.

In one configuration, an indication of the shorter duration associated with the modified timer may be stored in an ME or a USIM of the UE.

In one configuration, the UE may be a voice-centric UE.

Figure 11:
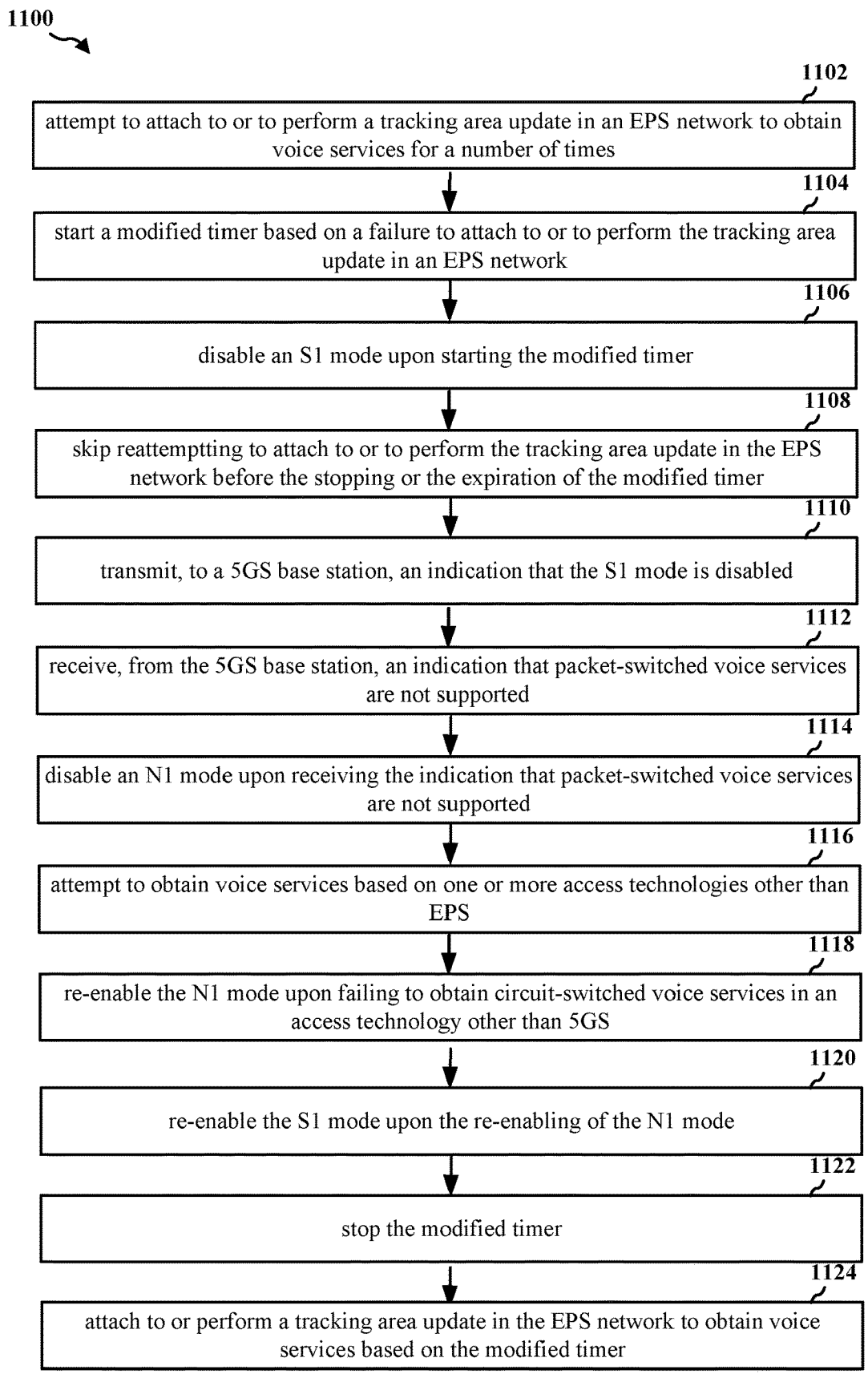
FIG. 11 is a flowchart of a method of wireless communication.

FIG. 11 is a flowchart 1100 of a method of wireless communication. The method may be performed by a UE (e.g., the UE 104/350/602; the apparatus 1502). At 1102, the UE may attempt to attach to or to perform a tracking area update in an EPS network to obtain voice services for a number of times. For example, 1102 may be performed by the component 198 in FIG. 15. The number of times may be a predetermined, or defined, number of times, in some aspects. Referring to FIG. 6, at 608, the UE 602 may attempt to attach to or to perform a tracking area update in an EPS network to obtain voice services for a number of times.

At 1104, the UE may start a modified timer based on a failure to attach to or to perform the tracking area update in an EPS network for the number of times and based on a configuration parameter. The modified timer may be modified based on a default timer. For example, 1104 may be performed by the component 198 in FIG. 15. Referring to FIG. 6, at 610, the UE 602 may start a modified timer based on a failure to attach to or to perform the tracking area update in an EPS network for the number of times and based on a configuration parameter.

At 1116, the UE may attempt to obtain the voice services based on one or more access technologies other than EPS. For example, 1116 may be performed by the component 198 in FIG. 15. Referring to FIG. 6, at 622, the UE 602 may attempt to obtain the voice services based on one or more access technologies other than EPS.

At 1124, the UE may attach to or perform a tracking area update in the EPS network to obtain voice services based on the modified timer (e.g., based on stopping the modified timer or based on an expiration of the modified timer). For example, 1124 may be performed by the component 198 in FIG. 15. Referring to FIG. 6, at 630, the UE 602 may attach to or perform a tracking area update in the EPS network to obtain voice services based on the modified timer.

In one configuration, at 1106, the UE may disable an S1 mode upon starting the modified timer. For example, 1106 may be performed by the component 198 in FIG. 15. Referring to FIG. 6, at 612, the UE 602 may disable an S1 mode upon starting the modified timer. At 1108, the UE may skip reattempting to attach to or to perform the tracking area update in the EPS network before the stopping or the expiration of the modified timer. For example, 1108 may be performed by the component 198 in FIG. 15. Referring to FIG. 6, at 614, the UE may skip reattempting to attach to or to perform the tracking area update in the EPS network before the stopping or the expiration of the modified timer.

In one configuration, in response to failing to obtain voice services based on the EPS, at 1110, the UE may transmit, to a 5GS base station, an indication that the S1 mode is disabled. For example, 1110 may be performed by the component 198 in FIG. 15. Referring to FIG. 6, at 616, the UE 602 may transmit, to a 5GS base station 604, an indication that the S1 mode is disabled. At 1112, the UE may receive, from the 5GS base station, an indication that packet-switched voice services are not supported. For example, 1112 may be performed by the component 198 in FIG. 15. Referring to FIG. 6, at 618, the UE 602 may receive, from the 5GS base station 604, an indication that packet-switched voice services are not supported. At 1114, the UE may disable an N1 mode upon receiving the indication that packet-switched voice services are not supported. For example, 1114 may be performed by the component 198 in FIG. 15. Referring to FIG. 6, at 620, the UE 602 may disable an N1 mode upon receiving the indication that packet-switched voice services are not supported. At 1118, the UE may re-enable the N1 mode upon failing to obtain circuit-switched voice services in an access technology other than 5GS. For example, 1118 may be performed by the component 198 in FIG. 15. Referring to FIG. 6, at 624, the UE 602 may re-enable the N1 mode upon failing to obtain circuit-switched voice services in an access technology other than 5GS.

In one configuration, at 1120, the UE may re-enable the S1 mode upon the re-enabling of the N1 mode. For example, 1120 may be performed by the component 198 in FIG. 15. Referring to FIG. 6, at 626, the UE 602 may re-enable the S1 mode upon the re-enabling of the N1 mode. At 1122, the UE may stop the modified timer upon the re-enabling of the S1 mode. For example, 1122 may be performed by the component 198 in FIG. 15. Referring to FIG. 6, at 628, the UE 602 may stop the modified timer upon the re-enabling of the S1 mode.

In one configuration, at 1120, the UE may re-enable the S1 mode upon the re-enabling of the N1 mode. For example, 1120 may be performed by the component 198 in FIG. 15. Referring to FIG. 6, at 626, the UE 602 may re-enable the S1 mode upon the re-enabling of the N1 mode. At 1122, the UE may stop the modified timer upon one of a reselection by the UE to the EPS network, or a handover or a redirection by a network to the EPS network. For example, 1122 may be performed by the component 198 in FIG. 15. Referring to FIG. 6, at 628, the UE 602 may stop the modified timer upon one of a reselection by the UE to the EPS network, or a handover or a redirection by a network to the EPS network.

In one configuration, the UE may be a voice-centric UE.

Figure 12:
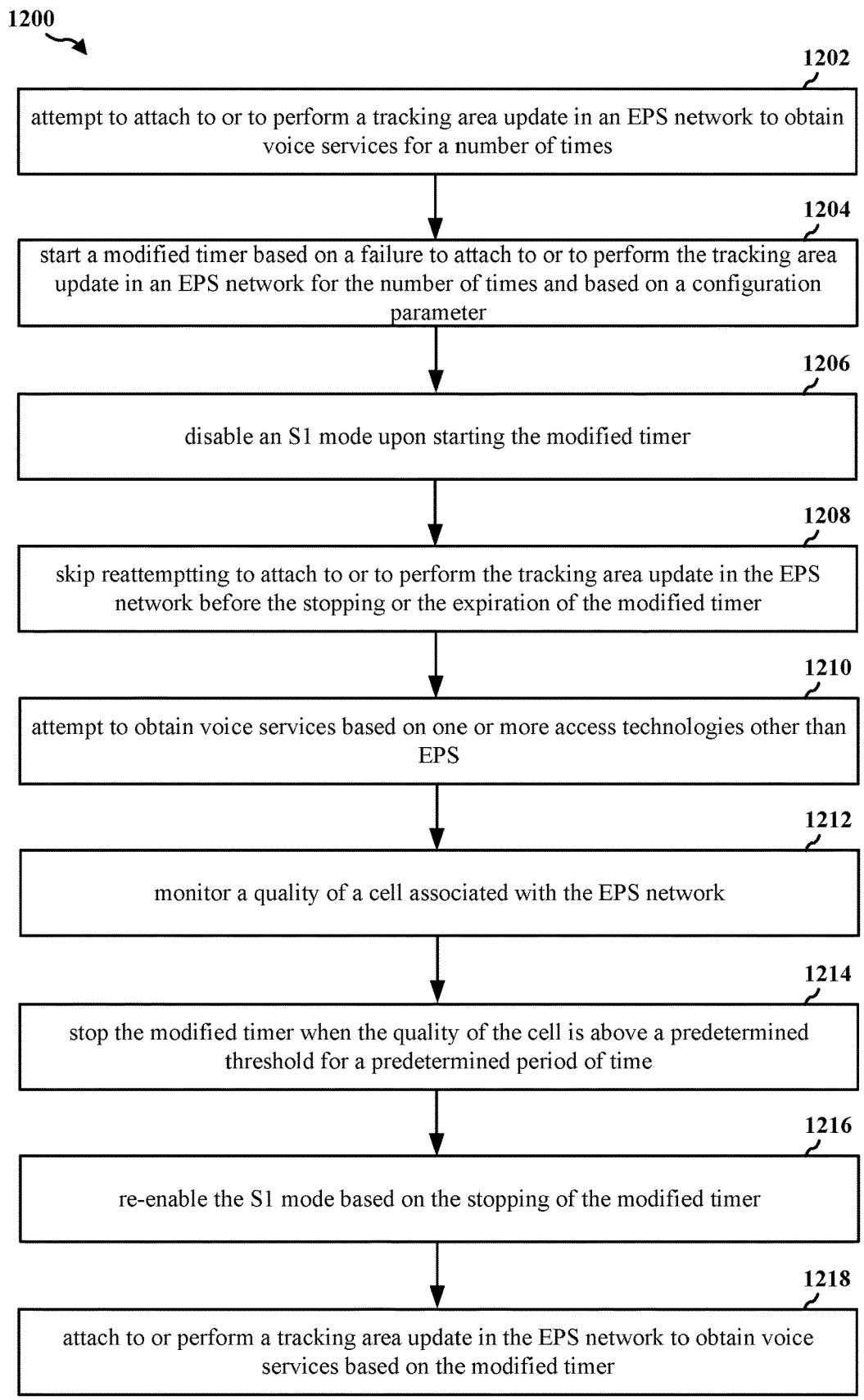
FIG. 12 is a flowchart of a method of wireless communication.

FIG. 12 is a flowchart 1200 of a method of wireless communication. The method may be performed by a UE (e.g., the UE 104/350/702; the apparatus 1502). At 1202, the UE may attempt to attach to or to perform a tracking area update in an EPS network to obtain voice services for a number of times. The number of times may be a predetermined, or defined, number of times, in some aspects. For example, 1202 may be performed by the component 198 in FIG. 15. Referring to FIG. 7, at 708, the UE 702 may attempt to attach to or to perform a tracking area update in an EPS network to obtain voice services for a number of times.

At 1204, the UE may start a modified timer based on a failure to attach to or to perform the tracking area update in an EPS network for the number of times and based on a configuration parameter. The modified timer may be modified based on a default timer. For example, 1204 may be performed by the component 198 in FIG. 15. Referring to FIG. 7, at 710, the UE 702 may start a modified timer based on a failure to attach to or to perform the tracking area update in an EPS network for the number of times and based on a configuration parameter.

At 1210, the UE may attempt to obtain the voice services based on one or more access technologies other than EPS. For example, 1210 may be performed by the component 198 in FIG. 15. Referring to FIG. 7, at 716, the UE 702 may attempt to obtain the voice services based on one or more access technologies other than EPS.

At 1218, the UE may attach to or perform a tracking area update in the EPS network to obtain voice services based on the modified timer (e.g., based on stopping the modified timer or based on an expiration of the modified timer). For example, 1218 may be performed by the component 198 in FIG. 15. Referring to FIG. 7, at 724, the UE 702 may attach to or perform a tracking area update in the EPS network to obtain voice services based on the modified timer.

In one configuration, at 1206, the UE may disable an Si mode upon starting the modified timer. For example, 1206 may be performed by the component 198 in FIG. 15. Referring to FIG. 7, at 712, the UE 702 may disable an Si mode upon starting the modified timer. At 1208, the UE may skip reattempting to attach to or to perform the tracking area update in the EPS network before the stopping or the expiration of the modified timer. For example, 1208 may be performed by the component 198 in FIG. 15. Referring to FIG. 7, at 714, the UE 702 may skip reattempting to attach to or to perform the tracking area update in the EPS network before the stopping or the expiration of the modified timer.

In one configuration, at 1212, the UE may monitor a quality of a cell associated with the EPS network. For example, 1212 may be performed by the component 198 in FIG. 15. Referring to FIG. 7, at 718, the UE 702 may monitor a quality of a cell associated with the EPS network. At 1214, the UE may stop the modified timer when the quality of the cell is above a predetermined threshold for a predetermined period of time. For example, 1214 may be performed by the component 198 in FIG. 15. Referring to FIG. 7, at 720, the UE 702 may stop the modified timer when the quality of the cell is above a predetermined threshold for a predetermined period of time. At 1216, the UE may re-enable the Si mode based on the stopping of the modified timer. For example, 1216 may be performed by the component 198 in FIG. 15. Referring to FIG. 7, at 722, the UE 702 may re-enable the S1 mode based on the stopping of the modified timer.

In one configuration, the UE may be a voice-centric UE.

Figure 13:
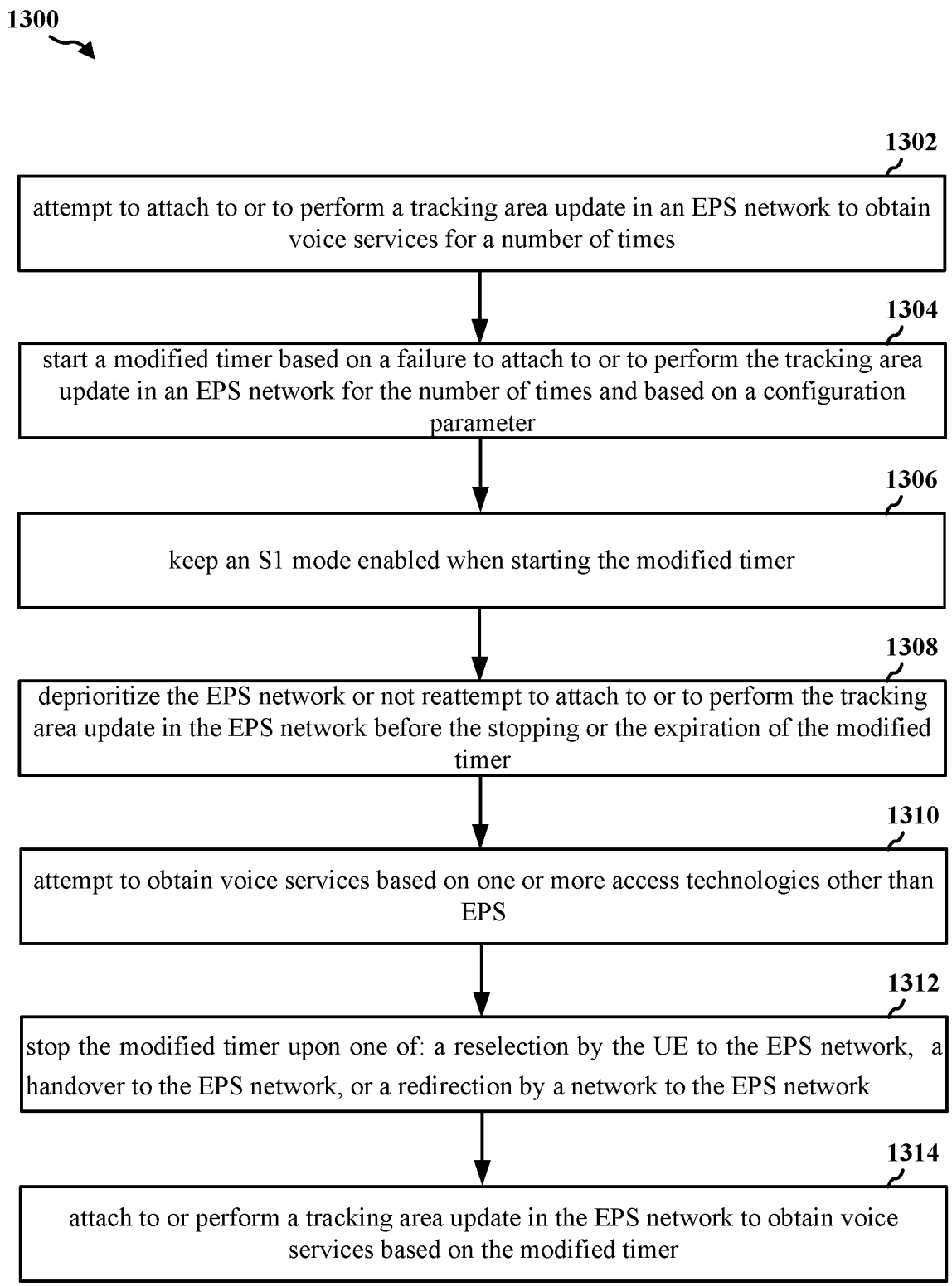
FIG. 13 is a flowchart of a method of wireless communication.

FIG. 13 is a flowchart 1300 of a method of wireless communication. The method may be performed by a UE (e.g., the UE 104/350/802; the apparatus 1502). At 1302, the UE may attempt to attach to or to perform a tracking area update in an EPS network to obtain voice services for a number of times. The number of times may be a predetermined, or defined, number of times, in some aspects. For example, 1302 may be performed by the component 198 in FIG. 15. Referring to FIG. 8, at 808, the UE 802 may attempt to attach to or to perform a tracking area update in an EPS network to obtain voice services for a number of times.

At 1304, the UE may start a modified timer based on a failure to attach to or to perform the tracking area update in an EPS network for the number of times and based on a configuration parameter. The modified timer may be modified based on a default timer. For example, 1304 may be performed by the component 198 in FIG. 15. Referring to FIG. 8, at 810, the UE 802 may start a modified timer based on a failure to attach to or to perform the tracking area update in an EPS network for the number of times and based on a configuration parameter.

At 1310, the UE may attempt to obtain the voice services based on one or more access technologies other than EPS. For example, 1310 may be performed by the component 198 in FIG. 15. Referring to FIG. 8, at 816, the UE 802 may attempt to obtain the voice services based on one or more access technologies other than EPS.

At 1314, the UE may attach to or perform a tracking area update in the EPS network to obtain voice services based on the modified timer. For example, 1314 may be performed by the component 198 in FIG. 15. Referring to FIG. 8, at 820, the UE 802 may attach to or perform a tracking area update in the EPS network to obtain voice services based on the modified timer.

In one configuration, at 1306, the UE may keep an Si mode enabled when starting the modified timer. For example, 1306 may be performed by the component 198 in FIG. 15. Referring to FIG. 8, at 812, the UE 802 may keep an Si mode enabled when starting the modified timer. At 1308, the UE may deprioritize the EPS network or not reattempt to attach to or to perform the tracking area update in the EPS network before the stopping or the expiration of the modified timer. For example, 1308 may be performed by the component 198 in FIG. 15. Referring to FIG. 8, at 814, the UE 802 may deprioritize the EPS network or not reattempt to attach to or to perform the tracking area update in the EPS network before the stopping or the expiration of the modified timer.

In one configuration, at 1312, the UE may stop the modified timer upon one of: a reselection by the UE to the EPS network, a handover to the EPS network, or a redirection by a network to the EPS network. For example, 1312 may be performed by the component 198 in FIG. 15.

Referring to FIG. 8, at 818, the UE 802 may stop the modified timer upon one of: a reselection by the UE to the EPS network, a handover to the EPS network, or a redirection by a network to the EPS network.

In one configuration, the UE may deprioritize one or more cells associated with the EPS network for cell reselection before the stopping or the expiration of the modified timer.

In one configuration, the UE may be a voice-centric UE.

Figure 14:
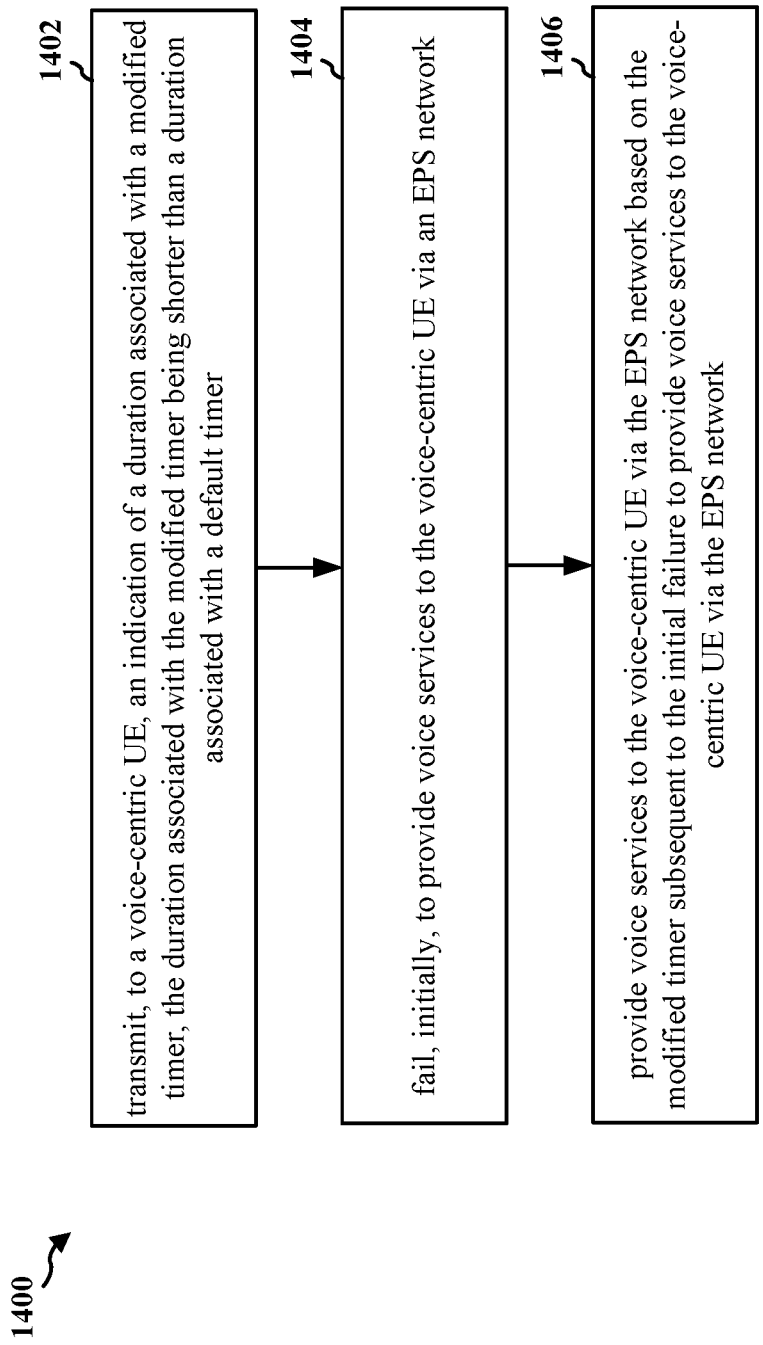
FIG. 14 is a flowchart of a method of wireless communication.

FIG. 14 is a flowchart 1400 of a method of wireless communication. The method may be performed by a base station (e.g., the base station 102/310/504; the network entity 1602). At 1402, the base station may transmit, to a voice-centric UE, an indication of a duration associated with a modified timer. The duration associated with the modified timer may be shorter than a duration associated with a default timer. For example, 1402 may be performed by the component 199 in FIG. 16. Referring to FIG. 5, at 508, the base station 504 may transmit, to a voice-centric UE 502, an indication of a duration associated with a modified timer.

At 1404, the base station may fail, initially, to provide voice services to the voice-centric UE via an EPS network. For example, 1404 may be performed by the component 199 in FIG. 16. Referring to FIG. 5, at 510, the base station 504 may fail, initially, to provide voice services to the voice-centric UE 502 via an EPS network.

At 1406, the base station may provide voice services to the voice-centric UE via the EPS network based on the modified timer subsequent to the initial failure to provide voice services to the voice-centric UE via the EPS network. For example, 1406 may be performed by the component 199 in FIG. 16. Referring to FIG. 5, at 522, the base station 504 may provide voice services to the voice-centric UE 502 via the EPS network based on the modified timer subsequent to the initial failure to provide voice services to the voice-centric UE 502 via the EPS network.

The modified timer and the default timer may be associated with a reattempt to attach to or to perform a tracking area update in the EPS network. Voice services may not be available over a 5GS or over a circuit-switched system.

Figure 15:
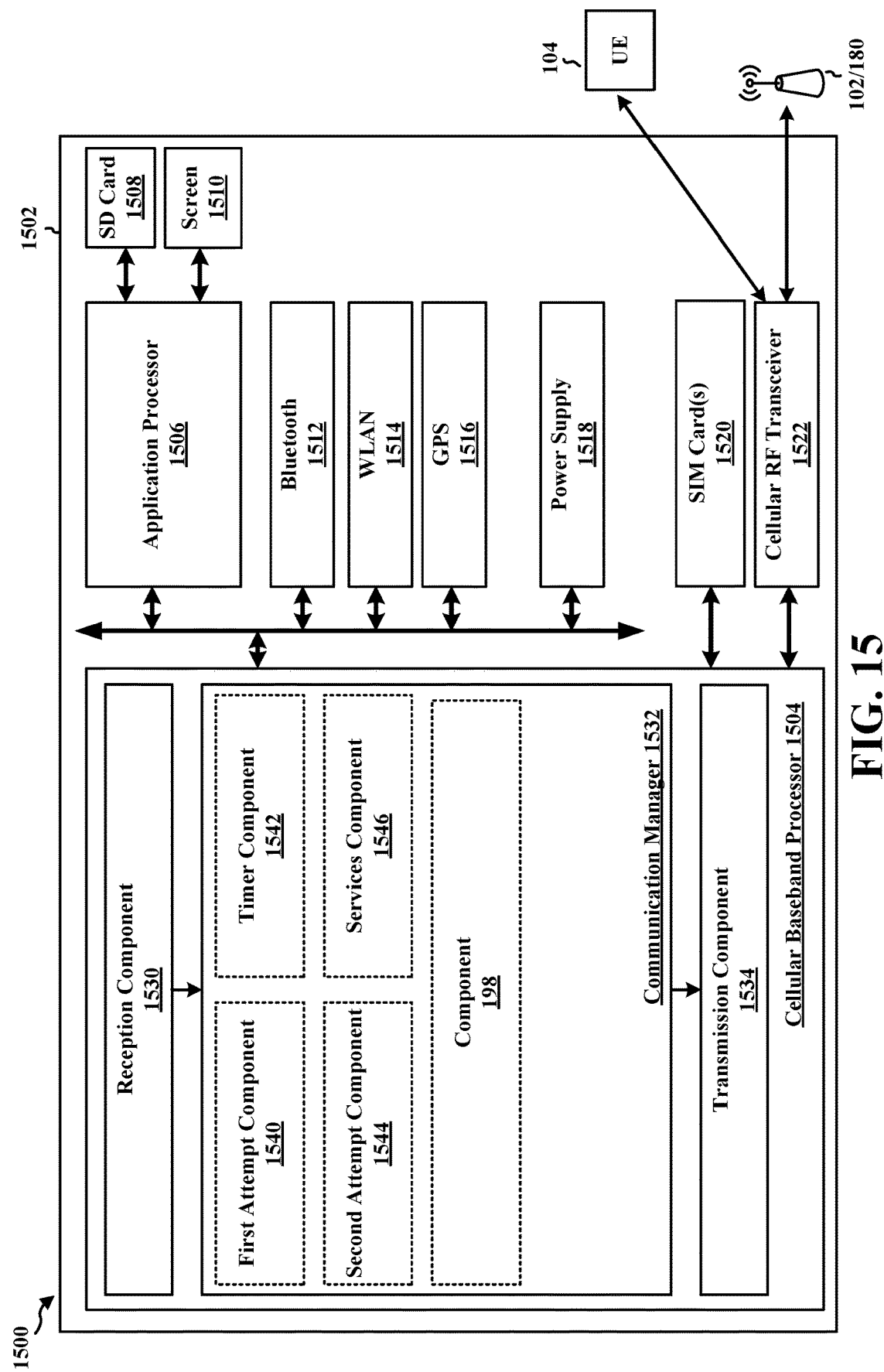
FIG. 15 is a diagram illustrating an example of a hardware implementation for an example apparatus and/or network entity.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a first attempt component 1540 that is configured to attempt to attach to or to perform a tracking area update in an EPS network to obtain voice services for a number of times, e.g., as described in connection with, 1004 in FIG. 10, 1102 in FIG. 11, 1202 in FIG. 12, and 1302 in FIG. 13. The communication manager 1532 further includes a timer component 1542 that is configured to start a modified timer based on a failure to attach to or to perform the tracking area update in an EPS network for the number of times and based on a configuration parameter, e.g., as described in connection with 902 in FIG. 9, 1006 in FIG. 10, 1104 in FIG. 11, 1204 in FIG. 12, and 1304 in FIG. 13. The communication manager 1532 further includes a second attempt component 1544 that is configured to attempt to obtain voice services based on one or more access technologies other than EPS, e.g., as described in connection with 904 in FIG. 9, 1012 in FIG. 10, 1116 in FIG. 11, 1210 in FIG. 12, and 1310 in FIG. 13. The communication manager 1532 further includes a services component 1546 that is configured to attach to or perform a tracking area update in the EPS network to obtain voice services based on the modified timer, e.g., as described in connection with 906 in FIG. 9, 1016 in FIG. 10, 1124 in FIG. 11, 1218 in FIG. 12, and 1314 in FIG. 13.

The communication manager 1532 further includes a services component 1546 that is configured to disable an S1 mode upon starting the modified timer, e.g., as described in connection with 1008 in FIG. 10, 1106 in FIGS. 11, and 1206 in FIG. 12. The services component 1546 may be further configured to skip reattempting to attach to or to perform the tracking area update in the EPS network before the stopping or the expiration of the modified timer, e.g., as described in connection with 1010 in FIG. 10, 1108 in FIGS. 11, and 1208 in FIG. 12. The services component 1546 may be further configured to reenable the S1 mode upon the expiration of the modified timer, e.g., as described in connection with 1014 in FIG. 10. The services component 1546 may be further configured to start the unmodified timer based on the failure to attach to or to perform the tracking area update in the EPS network after the modified timer has been used for a threshold number of times subsequent to a most recent powering up of the UE, e.g., as described in connection with 1018 in FIG. 10. The services component 1546 may be further configured to receive, from a base station, an indication of the shorter duration associated with the modified timer, e.g., as described in connection with 1002 in FIG. 10. The services component 1546 may be further configured to transmit, to a 5GS base station, an indication that the S1 mode is disabled, e.g., as described in connection with 1110 in FIG. 11. The services component 1546 may be further configured to receive, from the 5GS base station, an indication that packet-switched voice services are not supported, e.g., as described in connection with 1112 in FIG. 11. The services component 1546 may be further configured to disable an N1 mode upon receiving the indication that packet-switched voice services are not supported, e.g., as described in connection with 1114 in FIG. 11. The services component 1546 may be further configured to reenable the N1 mode upon failing to obtain circuit-switched voice services in an access technology other than 5GS, e.g., as described in connection with 1118 in FIG. 11. The services component 1546 may be further configured to reenable the S1 mode upon the re-enabling of the N1 mode, e.g., as described in connection with 1120 in FIG. 11. The services component 1546 may be further configured to stop the modified timer, e.g., as described in connection with 1122 in FIG. 11. The services component 1546 may be further configured to monitor a quality of a cell associated with the EPS network, e.g., as described in connection with 1212 in FIG. 12. The services component 1546 may be further configured to stop the modified timer when the quality of the cell is above a predetermined threshold for a predetermined period of time, e.g., as described in connection with 1214 in FIG. 12. The services component 1546 may be further configured to reenable the S1 mode based on the stopping of the modified timer, e.g., as described in connection with 1216 in FIG. 12. The services component 1546 may be further configured to keep an S1 mode enabled when starting the modified timer, e.g., as described in connection with 1306 in FIG. 13. The services component 1546 may be further configured to deprioritize the EPS network or not reattempt to attach to or to perform the tracking area update in the EPS network before the stopping or the expiration of the modified timer, e.g., as described in connection with 1308 in FIG. 13. The services component 1546 may be further configured to stop the modified timer upon one of: a reselection by the UE to the EPS network, a handover to the EPS network, or a redirection by a network to the EPS network., e.g., as described in connection with 1312 in FIG. 13.

The apparatus may include additional components that perform each of the blocks of the algorithm in the flowcharts of FIGS. 5-13. As such, each block in the flowcharts of FIGS. 5-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for attempting to attach to or to perform a tracking area update in an EPS network to obtain voice services for a number of times. The apparatus 1502 may include means for starting a modified timer based on a failure to attach to or to perform the tracking area update in an EPS network for the number of times and based on a configuration parameter. The modified timer may be modified based on a default timer. The apparatus 1502 may include means for attempting to obtain voice services based on one or more access technologies other than EPS. The apparatus 1502 may include means for attaching to or for performing a tracking area update in the EPS network to obtain voice services based on the modified timer.

In one configuration, the apparatus 1502 may include means for disabling an Si mode upon starting the modified timer. The apparatus 1502 may include means for skipping reattempting to attach to or to perform the tracking area update in the EPS network before the stopping or the expiration of the modified timer. In one configuration, the modified timer may be associated with a shorter duration than an unmodified/default timer. The apparatus 1502 may include means for re-enabling the S1 mode upon the expiration of the modified timer. In one configuration, the apparatus 1502 may include means for starting the unmodified/default timer based on the failure to attach to or to perform the tracking area update in the EPS network after the modified timer has been used for a threshold number of times subsequent to a most recent powering up of the UE. In one configuration, the shorter duration associated with the modified timer may be preconfigured. In one configuration, the apparatus 1502 may include means for receiving, from a base station, an indication of the shorter duration associated with the modified timer. In one configuration, an indication of the shorter duration associated with the modified timer may be stored in an ME or a USIM of the UE. In one configuration, in response to failing to obtain voice services based on the EPS, the apparatus 1502 may include means for transmitting, to a 5GS base station, an indication that the S1 mode is disabled. The apparatus 1502 may include means for receiving, from the 5GS base station, an indication that packet-switched voice services are not supported. The apparatus 1502 may include means for disabling an N1 mode upon receiving the indication that packet-switched voice services are not supported. The apparatus 1502 may include means for re-enabling the N1 mode upon failing to obtain circuit-switched voice services in an access technology other than 5GS. In one configuration, the apparatus 1502 may include means for re-enabling the S1 mode upon the re-enabling of the N1 mode. The apparatus 1502 may include means for stopping the modified timer upon the re-enabling of the S1 mode. In one configuration, the apparatus 1502 may include means for re-enabling the S1 mode upon the re-enabling of the N1 mode. The apparatus 1502 may include means for stopping the modified timer upon one of a reselection by the UE to the EPS network, or a handover or a redirection by a network to the EPS network. In one configuration, the apparatus 1502 may include means for monitoring a quality of a cell associated with the EPS network. The apparatus 1502 may include means for stopping the modified timer when the quality of the cell is above a predetermined threshold for a predetermined period of time. The apparatus 1502 may include means for re-enabling the S1 mode based on the stopping of the modified timer. In one configuration, the apparatus 1502 may include means for keeping an S1 mode enabled when starting the modified timer. The apparatus 1502 may include means for deprioritizing the EPS network or not reattempting to attach to or to perform the tracking area update in the EPS network before the stopping or the expiration of the modified timer. In one configuration, the apparatus 1502 may include means for stopping the modified timer upon one of: a reselection by the UE to the EPS network, a handover to the EPS network, or a redirection by a network to the EPS network. In one configuration, the apparatus 1502 may include means for deprioritizing one or more cells associated with the EPS network for cell reselection before the stopping or the expiration of the modified timer. In one configuration, the UE may be a voice-centric UE.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
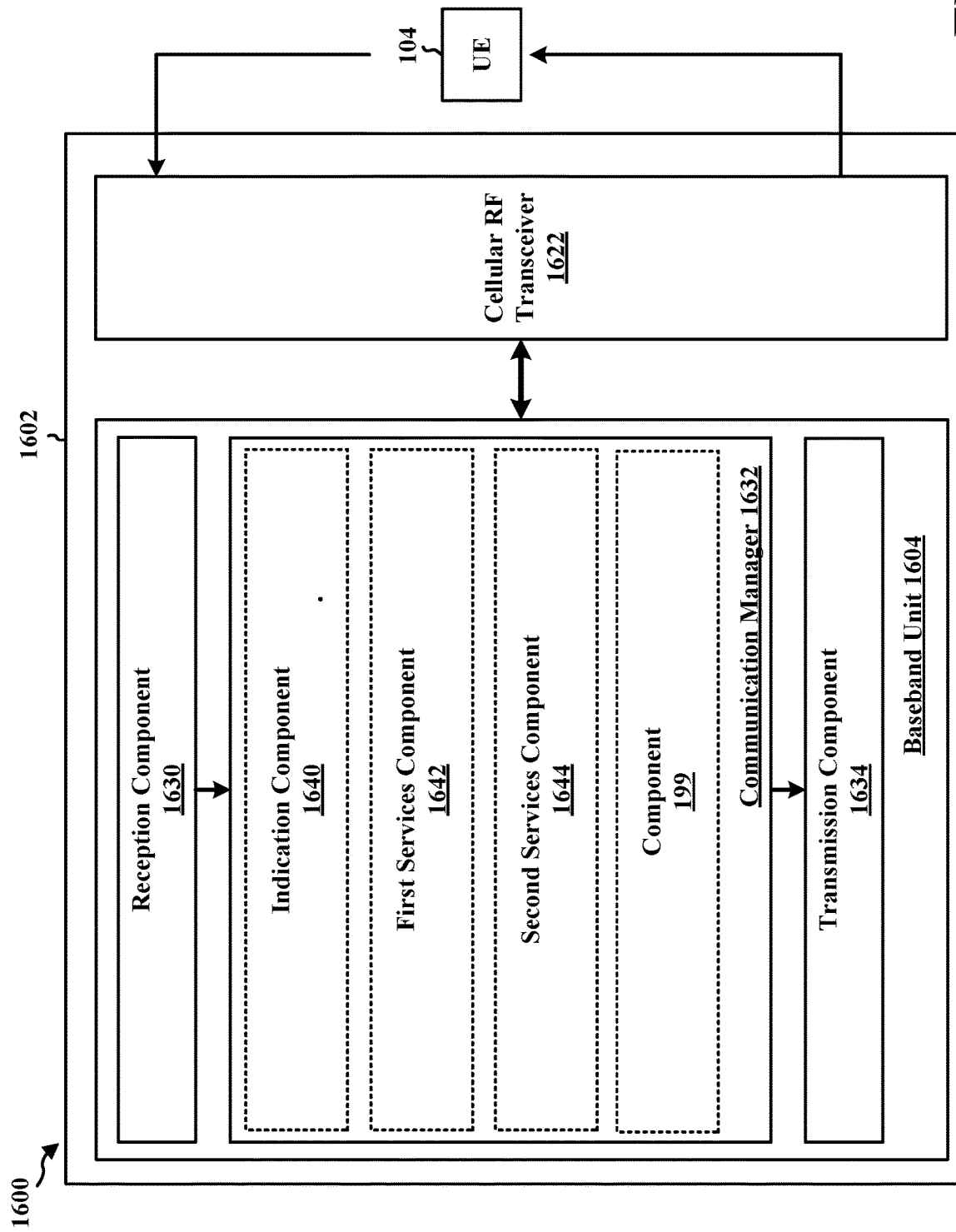
FIG. 16 is a diagram illustrating an example of a hardware implementation for an example network entity.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an indication component 1640 that is configured to transmit, to a voice-centric UE, an indication of a duration associated with a modified timer, e.g., as described in connection with 1402 in FIG. 14. The communication manager 1632 further includes a first services component 1642 that is configured to fail, initially, to provide voice services to the voice-centric UE via an EPS network, e.g., as described in connection with 1404 in FIG. 14. The communication manager 1632 further includes a second services component 1644 that is configured to provide voice services to the voice-centric UE via the EPS network based on the modified timer subsequent to the initial failure to provide voice services to the voice-centric UE via the EPS network, e.g., as described in connection with 1406 in FIG. 14.

The apparatus may include additional components that perform each of the blocks of the algorithm in the flowcharts of FIGS. 5-8 and 14. As such, each block in the flowcharts of FIGS. 5-8 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to a voice-centric UE, an indication of a duration associated with a modified timer. The apparatus 1602 may include means for failing, initially, to provide voice services to the voice-centric UE via an EPS network. The apparatus 1602 may include means for providing voice services to the voice-centric UE via the EPS network based on the modified timer subsequent to the initial failure to provide voice services to the voice-centric UE via the EPS network. The modified timer and the default timer may be associated with a reattempt to attach to or to perform a tracking area update in the EPS network. Voice services may not be available over a 5GS or over a circuit-switched system.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, a UE may attempt to attach to or to perform a tracking area update in an EPS network to obtain voice services for a number of times. The UE may start a modified timer based on a failure to attach to or to perform the tracking area update in an EPS network for the number of times and based on a configuration parameter. The modified timer may be modified based on a default timer. The UE may attempt to obtain the voice services based on one or more access technologies other than EPS. The UE may attach to or perform a tracking area update in the EPS network to obtain voice services based on the modified timer. In some aspects, the UE may not disable the Si mode when the modified timer is started or running, so that the UE may not waste the time attempting to obtain the voices services via legacy 2G/3G networks. Accordingly, the periods during which the voice-centric UE is without any access to voice services may be reduced, and user experience may be improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication at a UE including starting a modified timer based on a number of failed attempts associated with voice services for an EPS network and based on a configuration parameter, where the modified timer is modified based on a default timer; attempting to obtain the voice services based on one or more access technologies other than EPS; and attaching to or performing a tracking area update in the EPS network to obtain voice services based on the modified timer.

Aspect 2 is the method of aspect 1, further including: keeping an S1 mode enabled when starting the modified timer.

Aspect 3 is the method of aspect 2, further including: deprioritizing the EPS network or not reattempting to attach to or to perform the tracking area update in the EPS network before a stopping or an expiration of the modified timer; and stopping the modified timer upon one of: a reselection by the UE to the EPS network, a handover to the EPS network, or a redirection by a network to the EPS network.

Aspect 4 is the method of aspect 3, further including: deprioritizing one or more cells associated with the EPS network for cell reselection before the stopping or the expiration of the modified timer.

Aspect 5 is the method of any of aspects 1 to 4, where the UE is a voice-centric UE.

Aspect 6 is the method of any of aspects 1 to 5, where each of the number of failed attempts associated with voice services for the EPS network includes a failure to attach to or to perform a tracking area update in the EPS network to obtain voice services.

Aspect 7 is the method of aspect 1, further including: disabling an Si mode upon starting the modified timer; and skipping reattempting to attach to or to perform the tracking area update in the EPS network before a stopping or an expiration of the modified timer.

Aspect 8 is the method of aspect 7, where the modified timer is associated with a shorter duration than the default timer, and the at least one processor is further configured to: re-enable the Si mode upon the expiration of the modified timer.

Aspect 9 is the method of aspect 8, further including: starting the default timer based on the failure to attach to or to perform the tracking area update in the EPS network after the modified timer has been used for a threshold number of times subsequent to a most recent powering up of the UE.

Aspect 10 is the method of any of aspects 8 and 9, where the shorter duration associated with the modified timer is preconfigured.

Aspect 11 is the method of any of aspects 8 and 9, further including: receiving, from a base station, an indication of the shorter duration associated with the modified timer.

Aspect 12 is the method of any of aspects 8 to 11, where an indication of the shorter duration associated with the modified timer is stored in an ME or a USIM of the UE.

Aspect 13 is the method of aspect 7, where in response to failing to obtain voice services based on the EPS, the method further includes: transmitting, to a 5GS base station, an indication that the S1 mode is disabled; receiving, from the 5GS base station, an indication that packet-switched voice services are not supported; disabling an N1 mode upon receiving the indication that packet-switched voice services are not supported; and re-enabling the N1 mode upon failing to obtain circuit-switched voice services in an access technology other than 5GS.

Aspect 14 is the method of aspect 13, further including: re-enabling the S1 mode upon the re-enabling of the N1 mode; and stopping the modified timer upon the re-enabling of the S1 mode.

Aspect 15 is the method of aspect 13, further including: re-enabling the S1 mode upon the re-enabling of the N1 mode; and stopping the modified timer upon one of a reselection by the UE to the EPS network, or a handover or a redirection by a network to the EPS network.

Aspect 16 is the method of aspect 7, further including: monitoring a quality of a cell associated with the EPS network; stopping the modified timer when the quality of the cell is above a predetermined threshold for a predetermined period of time; and re-enabling the S1 mode based on the stopping of the modified timer.

Aspect 17 is a method for wireless communication at a network node including transmitting, to a voice-centric UE, an indication of a duration associated with a modified timer, the duration associated with the modified timer being shorter than a duration associated with a default timer; failing, initially, to provide voice services to the voice-centric UE via an EPS network; and providing voice services to the voice-centric UE via the EPS network based on the modified timer subsequent to the initial failure to provide voice services to the voice-centric UE via the EPS network, where the modified timer and the default timer are associated with a reattempt to attach to or to perform a tracking area update in the EPS network, and voice services are unavailable over a 5GS or over a circuit-switched system.

Aspect 18 is an apparatus for wireless communication including at least one processor coupled to a memory and, based at least in part on information stored in the memory, the at least one processor is configured to implement a method as in any of aspects 1 to 17.

Aspect 19 may be combined with aspect 18 and further includes a transceiver coupled to the at least one processor.

Aspect 20 is an apparatus for wireless communication including means for implementing any of aspects 1 to 17.

Aspect 21 is a non-transitory computer-readable storage medium storing computer executable code, where the code when executed by a processor causes the processor to implement any of aspects 1 to 17.

Various aspects have been described herein. These and other aspects are within the scope of the following claims.

What is claimed is:

1. An apparatus for wireless communication at a user equipment (UE), comprising:
   memory; and
   at least one processor coupled to the memory, and based at least in part on information stored in the memory, the at least one processor is configured, individually or in any combination, to:
      start a modified timer based on a number of failed attempts associated with voice services for an evolved packet system (EPS) network and based on a configuration parameter, wherein the modified timer is modified based on a default timer, and wherein the configuration parameter configures whether the UE is allowed to disable an S1 mode when starting the modified timer;
      attempt to obtain the voice services based on one or more access technologies other than EPS; and
      attach to or perform a tracking area update in the EPS network to obtain the voice services based on the modified timer.

2. The apparatus of claim 1, wherein the at least one processor, individually or in any combination, is further configured to:
   keep the S1 mode enabled when starting the modified timer.

3. The apparatus of claim 2, wherein the at least one processor, individually or in any combination, is further configured to:
   deprioritize the EPS network or not reattempt to attach to or to perform the tracking area update in the EPS network before a stopping or an expiration of the modified timer; and
   stop the modified timer upon one of:
      a reselection by the UE to the EPS network,
      a handover to the EPS network, or
      a redirection by a network to the EPS network.

4. The apparatus of claim 3, wherein the at least one processor, individually or in any combination, is further configured to:
   deprioritize one or more cells associated with the EPS network for cell reselection before the stopping or the expiration of the modified timer.

5. The apparatus of claim 1, wherein the UE is a voice-centric UE.

6. The apparatus of claim 1, wherein each of the number of failed attempts associated with the voice services for the EPS network comprises a failure to attach to or to perform the tracking area update in the EPS network to obtain the voice services.

7. The apparatus of claim 1, wherein the at least one processor, individually or in any combination, is further configured to:
   disable the S1 mode upon starting the modified timer; and
   skip reattempting to attach to or to perform the tracking area update in the EPS network before a stopping or an expiration of the modified timer.

8. The apparatus of claim 7, wherein the modified timer is associated with a shorter duration than the default timer, and wherein the at least one processor, individually or in any combination, is further configured to:
   re-enable the S1 mode upon the expiration of the modified timer.

9. The apparatus of claim 8, wherein the at least one processor, individually or in any combination, is further configured to:
   start the default timer based on a failure to attach to or to perform the tracking area update in the EPS network after the modified timer has been used for a threshold number of times subsequent to a most recent powering up of the UE.

10. The apparatus of claim 8, wherein the shorter duration associated with the modified timer is preconfigured.

11. The apparatus of claim 8, wherein the at least one processor, individually or in any combination, is further configured to:
   receive, from a base station, an indication of the shorter duration associated with the modified timer.

12. The apparatus of claim 8, wherein an indication of the shorter duration associated with the modified timer is stored in a mobile equipment (ME) or a universal subscriber identify module (USIM) of the UE.

13. The apparatus of claim 7, wherein in response to failing to obtain the voice services based on the EPS, the at least one processor, individually or in any combination, is further configured to:
   transmit, to a 5th generation (5G) system (5GS) base station, a first indication that the S1 mode is disabled;
   receive, from the 5GS base station, a second indication that packet-switched voice services are not supported;
   disable an NI mode upon receiving the second indication that the packet-switched voice services are not supported; and
   re-enable the NI mode upon failing to obtain circuit-switched voice services in an access technology other than 5GS.

14. The apparatus of claim 13, wherein the at least one processor, individually or in any combination, is further configured to:
   re-enable the S1 mode upon a re-enabling of the NI mode; and
   stop the modified timer upon the re-enabling of the S1 mode.

15. The apparatus of claim 13, wherein the at least one processor, individually or in any combination, is further configured to:
   re-enable the S1 mode upon the re-enabling of the NI mode; and
   stop the modified timer upon one of a reselection by the UE to the EPS network, or a handover or a redirection by a network to the EPS network.

16. The apparatus of claim 7, wherein the at least one processor, individually or in any combination, is further configured to:

monitor a quality of a cell associated with the EPS network;
stop the modified timer when the quality of the cell is above a predetermined threshold for a predetermined period of time; and
re-enable the S1 mode based on the stopping of the modified timer.

17. The apparatus of claim 1, further comprising a transceiver coupled to the memory and the at least one processor.

18. A method of wireless communication at a user equipment (UE), comprising:
starting a modified timer based on a number of failed attempts associated with voice services for an evolved packet system (EPS) network and based on a configuration parameter, wherein the modified timer is modified based on a default timer, and wherein the configuration parameter configures whether the UE is allowed to disable an S1 mode when starting the modified timer;
attempting to obtain the voice services based on one or more access technologies other than EPS; and
attaching to or performing a tracking area update in the EPS network to obtain the voice services based on the modified timer.

19. The method of claim 18, further comprising:
keeping the S1 mode enabled when starting the modified timer.

20. The method of claim 19, further comprising:
deprioritizing the EPS network or not reattempting to attach or to perform the tracking area update in the EPS network before a stopping or an expiration of the modified timer; and
stopping the modified timer upon one of:
a reselection by the UE to the EPS network,
a handover to the EPS network, or
a redirection by a network to the EPS network.

21. The method of claim 20, further comprising:
deprioritizing one or more cells associated with the EPS network for cell reselection before the stopping or the expiration of the modified timer.

22. The method of claim 18, wherein the UE is a voice-centric UE.

23. The method of claim 18, wherein each of the number of failed attempts associated with the voice services for the EPS network comprises a failure to attach to or to perform the tracking area update in the EPS network to obtain the voice services.

24. The method of claim 18, further comprising:
disabling the S1 mode upon starting the modified timer; and
skipping reattempting to attach to or to perform the tracking area update in the EPS network before a stopping or an expiration of the modified timer.

25. The method of claim 24, wherein the modified timer is associated with a shorter duration than the default timer, and the method further comprises:
re-enabling the S1 mode upon the expiration of the modified timer.

26. The method of claim 25, further comprising:
starting the default timer based on a failure to attach to or to perform the tracking area update in the EPS network after the modified timer has been used for a threshold number of times subsequent to a most recent powering up of the UE.

27. The method of claim 25, wherein the shorter duration associated with the modified timer is preconfigured.

28. An apparatus for wireless communication at a network node, comprising:
memory; and
at least one processor coupled to the memory, and based on at least in part on information stored in the memory, the at least one processor configured, individually or in any combination, to:
transmit, to a voice-centric user equipment (UE), an indication of a duration associated with a modified timer and a configuration parameter, the duration associated with the modified timer being shorter than a duration associated with a default timer, and wherein the configuration parameter configures whether the UE is allowed to disable an S1 mode when starting the modified timer;
fail, initially, to provide voice services to the voice-centric UE via an evolved packet system (EPS) network; and
provide the voice services to the voice-centric UE via the EPS network based on the modified timer subsequent to the initial failure to provide the voice services to the voice-centric UE via the EPS network,
wherein the modified timer and the default timer are associated with a reattempt to attach to or to perform a tracking area update in the EPS network, and the voice services are unavailable over a 5th generation (5G) system (5GS) or over a circuit-switched system.

29. The apparatus of claim 28, further comprising a transceiver coupled to the memory and the at least one processor.

30. A method of wireless communication at a network node, comprising:
transmitting, to a voice-centric user equipment (UE), an indication of a duration associated with a modified timer and a configuration parameter, the duration associated with the modified timer being shorter than a duration associated with a default timer, and wherein the configuration parameter configures whether the UE is allowed to disable an SI mode when starting the modified timer;
failing, initially, to provide voice services to the voice-centric UE via an evolved packet system (EPS) network; and
providing the voice services to the voice-centric UE via the EPS network based on the modified timer subsequent to the initial failure to provide the voice services to the voice-centric UE via the EPS network,
wherein the modified timer and the default timer are associated with a reattempt to attach to or to perform a tracking area update in the EPS network, and the voice services are unavailable over a 5th generation (5G) system (5GS) or over a circuit-switched system.

* * * * *